US012464036B2

(12) United States Patent
Pandiri et al.

(10) Patent No.: US 12,464,036 B2
(45) Date of Patent: Nov. 4, 2025

(54) MAINTAINING SESSIONS INFORMATION IN MULTI-REGION CLOUD ENVIRONMENT

(71) Applicant: Oracle International Corporation, Redwood Shores, CA (US)

(72) Inventors: Kranthi Kiran Pandiri, Redmond, WA (US); Shobhank Sharma, Kirkland, WA (US); Girish Nagaraja, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 617 days.

(21) Appl. No.: 17/896,969

(22) Filed: Aug. 26, 2022

(65) Prior Publication Data

US 2023/0097763 A1 Mar. 30, 2023

Related U.S. Application Data

(60) Provisional application No. 63/356,884, filed on Jun. 29, 2022, provisional application No. 63/250,604, filed on Sep. 30, 2021.

(51) Int. Cl.
*H04L 67/02* (2022.01)
*H04L 67/14* (2022.01)

(52) U.S. Cl.
CPC .............. *H04L 67/02* (2013.01); *H04L 67/14* (2013.01); *G06F 2209/5016* (2013.01)

(58) Field of Classification Search
None
See application file for complete search history.

(56) References Cited

U.S. PATENT DOCUMENTS 8,474,018 B2   6/2013  Mardikar et al.
8,732,800 B1   5/2014  Askew
(Continued)

FOREIGN PATENT DOCUMENTS

CN   108737331 A   11/2018
CN   110336820 A   10/2019
(Continued)

OTHER PUBLICATIONS

Hu et al., Multiparty Authorization Framework for Data Sharing in Online Social Networks, Data and Applications Security and Privacy XXV, Jul. 11, 2011, pp. 29-43.
(Continued)

*Primary Examiner* — Quang N Nguyen
(74) *Attorney, Agent, or Firm* — Kilpatrick Townsend & Stockton LLP

(57) ABSTRACT

Techniques are described that enable, in a multi-region cloud environment, information regarding one or more tenancy sessions that a network access program (e.g., a browser) participates in to be efficiently stored in a centralized location. The centrally stored sessions information can then be used for various purposes such as for restricting the number of tenancy sessions using a network access program, sessions cleanup, and other sessions-related tasks. In certain implementations, the centrally stored sessions information is used to prevent the network access program from opening multiple sessions for the same tenancy. In such implementations, for a particular tenancy, the network access program is allowed to have only one active session for the particular tenancy at a time. The centrally stored sessions information facilitates efficient sessions management including session cleanup after a session is closed.

17 Claims, 15 Drawing Sheets

(56) References Cited

U.S. PATENT DOCUMENTS

| | | | |
|---|---|---|---|
| 8,776,201 | B2 | 7/2014 | Gao et al. |
| 8,990,911 | B2 | 3/2015 | Olden et al. |
| 9,053,302 | B2 | 6/2015 | Sastry et al. |
| 9,491,200 | B2 | 11/2016 | Mardikar et al. |
| 9,560,036 | B2 | 1/2017 | Hinton et al. |
| 9,781,122 | B1 | 10/2017 | Wilson et al. |
| 9,838,376 | B1 | 12/2017 | Lander et al. |
| 10,225,242 | B2 | 3/2019 | Grim et al. |
| 10,255,061 | B2 | 4/2019 | Lander et al. |
| 10,341,410 | B2 | 7/2019 | Lander et al. |
| 10,425,386 | B2 | 9/2019 | Wardell et al. |
| 10,454,940 | B2 | 10/2019 | Lander et al. |
| 10,484,243 | B2 | 11/2019 | Cole et al. |
| 10,484,382 | B2 | 11/2019 | Wilson et al. |
| 10,511,589 | B2 | 12/2019 | Gangawane et al. |
| 10,594,684 | B2 | 3/2020 | Bansal et al. |
| 10,616,224 | B2 | 4/2020 | Subramanian et al. |
| 10,715,564 | B2 | 7/2020 | Mohamad Abdul et al. |
| 10,798,165 | B2 | 10/2020 | Srinivasan et al. |
| 10,846,390 | B2 | 11/2020 | Subramanian et al. |
| 10,878,079 | B2 | 12/2020 | Vepa et al. |
| 10,931,656 | B2 | 2/2021 | Carru et al. |
| 11,061,929 | B2 | 7/2021 | Xu et al. |
| 11,108,828 | B1 | 8/2021 | Curtis et al. |
| 11,165,634 | B2 | 11/2021 | Medam et al. |
| 11,308,132 | B2 | 4/2022 | Srinivasan et al. |
| 11,321,343 | B2 | 5/2022 | Srinivasan et al. |
| 11,599,677 | B2 | 3/2023 | Buscaglia et al. |
| 11,606,391 | B2 | 3/2023 | Greenebaum et al. |
| 11,627,123 | B2* | 4/2023 | Stayskal ............ H04L 63/0442 726/7 |
| 11,847,239 | B2 | 12/2023 | Grand |
| 11,962,624 | B2 | 4/2024 | Kuehr-mclaren et al. |
| 12,413,569 | B2 | 9/2025 | Sharma et al. |
| 2005/0154913 | A1 | 7/2005 | Barriga et al. |
| 2006/0074894 | A1 | 4/2006 | Remahl et al. |
| 2007/0056018 | A1 | 3/2007 | Ridlon et al. |
| 2007/0143291 | A1 | 6/2007 | Browne |
| 2008/0276296 | A1 | 11/2008 | Larsen |
| 2009/0249060 | A1 | 10/2009 | Dossett et al. |
| 2013/0227658 | A1 | 8/2013 | Leicher et al. |
| 2013/0283350 | A1 | 10/2013 | Afek et al. |
| 2014/0075942 | A1 | 3/2014 | Rewers et al. |
| 2014/0082715 | A1 | 3/2014 | Grajek et al. |
| 2014/0181003 | A1 | 6/2014 | Kling et al. |
| 2015/0089575 | A1 | 3/2015 | Vepa et al. |
| 2015/0188906 | A1 | 7/2015 | Minov et al. |
| 2015/0215348 | A1 | 7/2015 | Koeten et al. |
| 2015/0350338 | A1 | 12/2015 | Barnett et al. |
| 2016/0072839 | A1 | 3/2016 | Mortimore, Jr. |
| 2016/0277390 | A1 | 9/2016 | Minov et al. |
| 2016/0359861 | A1 | 12/2016 | Manov et al. |
| 2017/0063931 | A1 | 3/2017 | Seed et al. |
| 2017/0177894 | A1 | 6/2017 | Stock et al. |
| 2017/0230419 | A1 | 8/2017 | Prafullchandra et al. |
| 2017/0329957 | A1 | 11/2017 | Vepa et al. |
| 2017/0331802 | A1 | 11/2017 | Keshava et al. |
| 2017/0331832 | A1 | 11/2017 | Lander et al. |
| 2018/0081905 | A1 | 3/2018 | Kamath et al. |
| 2018/0144150 | A1 | 5/2018 | Aakolk et al. |
| 2018/0234416 | A1 | 8/2018 | Moerk et al. |
| 2018/0349593 | A1 | 12/2018 | Mondello et al. |
| 2019/0068377 | A1 | 2/2019 | Matsugashita et al. |
| 2019/0073468 | A1 | 3/2019 | Kazerani et al. |
| 2019/0273746 | A1 | 9/2019 | Coffing |
| 2019/0362087 | A1 | 11/2019 | Ferrans et al. |
| 2020/0007530 | A1 | 1/2020 | Mohamad Abdul et al. |
| 2020/0053091 | A1 | 2/2020 | Childress et al. |
| 2020/0120098 | A1 | 4/2020 | Berg et al. |
| 2020/0264860 | A1 | 8/2020 | Srinivasan et al. |
| 2021/0044595 | A1 | 2/2021 | Childress et al. |
| 2021/0081252 | A1 | 3/2021 | Bhargava et al. |
| 2021/0084031 | A1 | 3/2021 | Lao et al. |
| 2021/0234706 | A1 | 7/2021 | Nair et al. |
| 2021/0377044 | A1 | 12/2021 | Leibmann et al. |
| 2022/0116376 | A1* | 4/2022 | Stayskal ............ H04L 65/4015 |
| 2022/0210194 | A1 | 6/2022 | Parekh et al. |
| 2022/0210195 | A1 | 6/2022 | Parekh et al. |
| 2022/0210196 | A1 | 6/2022 | Parekh et al. |
| 2022/0239640 | A1* | 7/2022 | Wang ................ H04L 63/0892 |
| 2022/0247787 | A1 | 8/2022 | Lippert et al. |
| 2023/0103886 | A1* | 4/2023 | Sharma ............... H04L 9/0894 726/8 |
| 2025/0080530 | A1* | 3/2025 | Trinelli ............. H04L 63/0807 |

FOREIGN PATENT DOCUMENTS

| | | |
|---|---|---|
| CN | 115699678 A | 2/2023 |
| EP | 3528454 A1 | 8/2019 |
| WO | 2018053122 A1 | 3/2018 |

OTHER PUBLICATIONS

Moghaddam et al., A Multi-Layered Policy Generation and Management Engine for Semantic Policy, Digital Communications and Networks, vol. 6, No. 1, Feb. 1, 2020, pp. 38-50.

International Application No. PCT/US2022/045348, International Search Report and Written Opinion mailed on Jan. 19, 2023, 13 pages.

International Application No. PCT/US2022/045370, International Search Report and Written Opinion mailed on Jan. 23, 2023, 13 pages.

Wu et al., A Trust-Evaluation-Enhanced Blockchain-Secured Industrial IoT System, IEEE Internet of Things Journal, vol. 8, No. 7, Oct. 13, 2020, pp. 5510-5517.

AWS Single Sign-On, AWS, Available online at https://aws.amazon.com/single-sign-on/, Accessed from Internet on Sep. 20, 2021, pp. 1-11.

International Application No. PCT/US2022/045348, International Preliminary Report on Patentability mailed on Apr. 11, 2024, 9 pages.

International Application No. PCT/US2022/045370, International Preliminary Report on Patentability mailed on Apr. 11, 2024, 10 pages.

Shoemaker, Introduction to IndexedDB: The In-Browser Database, CODE Magazine, Available Online at: https://www.codemag.com/article/1411041/Introduction-to-IndexedDB-The-In-Browser-Database, Aug. 31, 2021, 27 pages.

U.S. Appl. No. 17/955,820, Non-Final Office Action mailed on Sep. 16, 2024, 26 pages.

U.S. Appl. No. 17/957,146, Non-Final Office Action mailed on Sep. 23, 2024, 19 pages.

U.S. Appl. No. 17/957,522, Non-Final Office Action mailed on Sep. 10, 2024, 12 pages.

Bailey et al., Self-Adaptive Authorization Framework for Policy Based RBAC/ABAC Models, Institute of Electrical and Electronics Engineers Ninth International Conference on Dependable, Autonomic and Secure Computing, Dec. 12-14, 2011, pp. 37-44.

Pal et al., On Design of A Fine-Grained Access Control Architecture for Securing IoT-Enabled Smart Healthcare Systems, Association for Computing Machinery, MobiQuitous: Proceedings of the 14th EAI International Conference on Mobile and Ubiquitous Systems: Computing, Networking and Services, Nov. 7, 2017, pp. 432-441.

Schuster et al., Situational Access Control in the Internet of Things, Session 6A: IOT, Proceedings of the 2018 Association for Computing Machinery SIGSAC Conference on Computer and Communications Security, Oct. 15-19, 2018, pp. 1056-1073.

Wang et al., Private Set Intersection with Authorization Over Outsourced Encrypted Datasets, Institute of Electrical and Electronics Engineers Transactions on Information Forensics and Security, vol. 16, Jul. 28, 2021, pp. 4050-4062.

U.S. Appl. No. 17/955,820, Notice of Allowance mailed on May 1, 2025, 5 pages.

U.S. Appl. No. 17/957,146, Final Office Action, mailed on Mar. 7, 2025, 24 pages.

U.S. Appl. No. 17/957,522, Non-Final Office Action, mailed on Apr. 17, 2025, 15 pages.

(56) References Cited

OTHER PUBLICATIONS

Long et al., RACAC: An Approach toward RBAC and ABAC Combining Access Control, Institute of Electrical and Electronics Engineers 5th International Conference on Computer and Communications, Dec. 6, 2019, pp. 1609-1616.

Paul, Authentication and Authorization for the Front-end Web Developer, School of Science, Jun. 22, 2020, 61 pages.

Qi et al., Access Control Model Based on Role and Attribute and Its Applications on Space-Ground Integration Networks, 4th International Conference on Computer Science and Network Technology, vol. 1, Dec. 19, 2015, pp. 1118-1122.

Access Control, Google Cloud, Available Online at: https://cloud.google.com/kubernetes-engine/docs/concepts/access-control, Accessed from Interneton Sep. 16, 2021, 3 pages.

AWS IAM Identity Center (Successorto AWS Single Sign-On), Centrally Manage Workforce Access to Multiple AWS Accounts and Applications, Available Online at: https://aws.amazon.com/iam/identity-center/, Accessed from Internet on Dec. 20, 2022, 7 pages.

How does SAML Single Logout Requestwork?, Available Online at: https://support.servicenow.com/kbid=kb_article_view&sysparm_article=KB0788164, Sep. 20, 2021, 2 pages.

How Does Single Sign-on Work?, How Single Sign-on Works, Step by Step, Available online at https://www.onelogin.com/learn/how-single-sign-on-works, Accessed from Interneton Sep. 20, 2021, pp. 1-5.

IDM365 Identity and Access Management forthe RBAC/ABAC Hybrid Solution, IDM 365, Available Online at: https://idm365.com/idm365-the-rbac-abac-hybrid-solution/, Accessed from Internet on Sep. 20, 2021, 5 pages.

IdP Single Logout (SLO), Available Online at: https://docs.pingidentity.com/bundle/integrations/page/gdz1563995023643.html, Jul. 24, 2019, 1 page.

Multicloud Identity and Access Management Architecture, IBM Cloud, Available Online at: https://www.ibm.com/cloud/architecture/architectures/security-iam/reference-architecture, Accessed from Internet on Sep. 16, 2021, 4 pages.

OpenID Connect Single Logout, Available Online at: https://is.docs.wso2.com/en/latest/learn/openid-connect-single-logout/, Accessed from Internet on Sep. 23, 2021, 18 pages.

Single Logout (SLO), Available Online at: https://identitydocs.akamai.com/gettingstarted/sessions/3logout/page2-slo/, Accessed from Internet on Sep. 20, 2021, 2 pagges.

Single Sign-On SSO, JWT SSO, Available Online at: https://www.miniorange.com/saml-identity-provider-with-jwt-protocol, Accessed from Internet on Sep. 20, 2021, 7 pages.

Single Sign-Out SAML Protocol, Microsoft Docs, Available Online at: https://docs.microsoft.com/enus/azure/activedirectory/develop/single-sign-out-saml-protocol, Aug. 24, 2021, 3 pages.

The Definitive Guide to Attribute-Based Access Control (ABAC), Nextlabs, Available Online at: https://www.nextlabs.com/products/technology/abac/, Accessed from Internet on Sep. 16, 2021, 10 pages.

Use IdP-Initiated Single Logout (SLO), Available Online at: https://help.sap.com/viewer/6d6d63354d1242d185ab4830fc04feb1/Cloud/enUS/da2e4f9866dc45f0b4723ca41f051bea.html, Accessed from Internet on Sep. 20, 2021, 1 page.

User Management Service Single Sign-on, IBM Documentation, Available online at https://www.ibm.com/docs/en/cloud-paks/1.0?topic=services-ums-single-sign, Accessed from Internet on Sep. 20, 2021, pp. 1-3.

What is Azure Attribute-Based Access Control (Azure ABAC)?, Microsoft Docs, Available Online at: https://docs.microsoft.com/en-us/azure/role-based-access-control/conditions-overview, May 13, 2021, 7 pages.

What is Azure role-based Access Control (Azure RBAC)?, Microsoft, Available Online at: https://docs.microsoft.com/en-us/azure/role-based-access-control/overview, May 17, 2021, 7 pages.

Why SSO is only Part of Multi-Cloud Identity, Available Online at: https://www.strata.io/resources/blog/multi-cloud-identity/sso-only-part-of-multi-cloud-identity/, Jun. 1, 2021, 6 pages.

Parker, A Guide to Authorization: A Discussion of New Best Practices Using Hybrid Role and Attribute Techniques, Available Online at: https://f.hubspotusercontent10.net/hubfs/174819/docs/A%20Guide%20To%20Authorization%20by%20EmpowerID.pdf, Mar. 2021, 64 pages.

Van Blijderveen et al., How to Scale Your Authorization Needs by Using Attribute-Based Access Control With S3, Available Online at: https://aws.amazon.com/blogs/security/how-to-scale-authorization-needs-using-attribute-based-access-control-with-s3/, Mar. 18, 2021, 13 pages.

U.S. Appl. No. 17/955,820 , "Corrected Notice of Allowability", Aug. 20, 2025, 2 pages.

U.S. Appl. No. 17/955,820 , "Corrected Notice of Allowability", Jun. 18, 2025, 2 pages.

U.S. Appl. No. 17/957,146 , Non-Final Office Action, Mailed On Sep. 19, 2025, 17 pages Beyond, Jul. 6, 2018, 9 pages.

Chavan "Web Application Security: CAS and Beyond", Jul. 6, 2018, 9 pages.

* cited by examiner

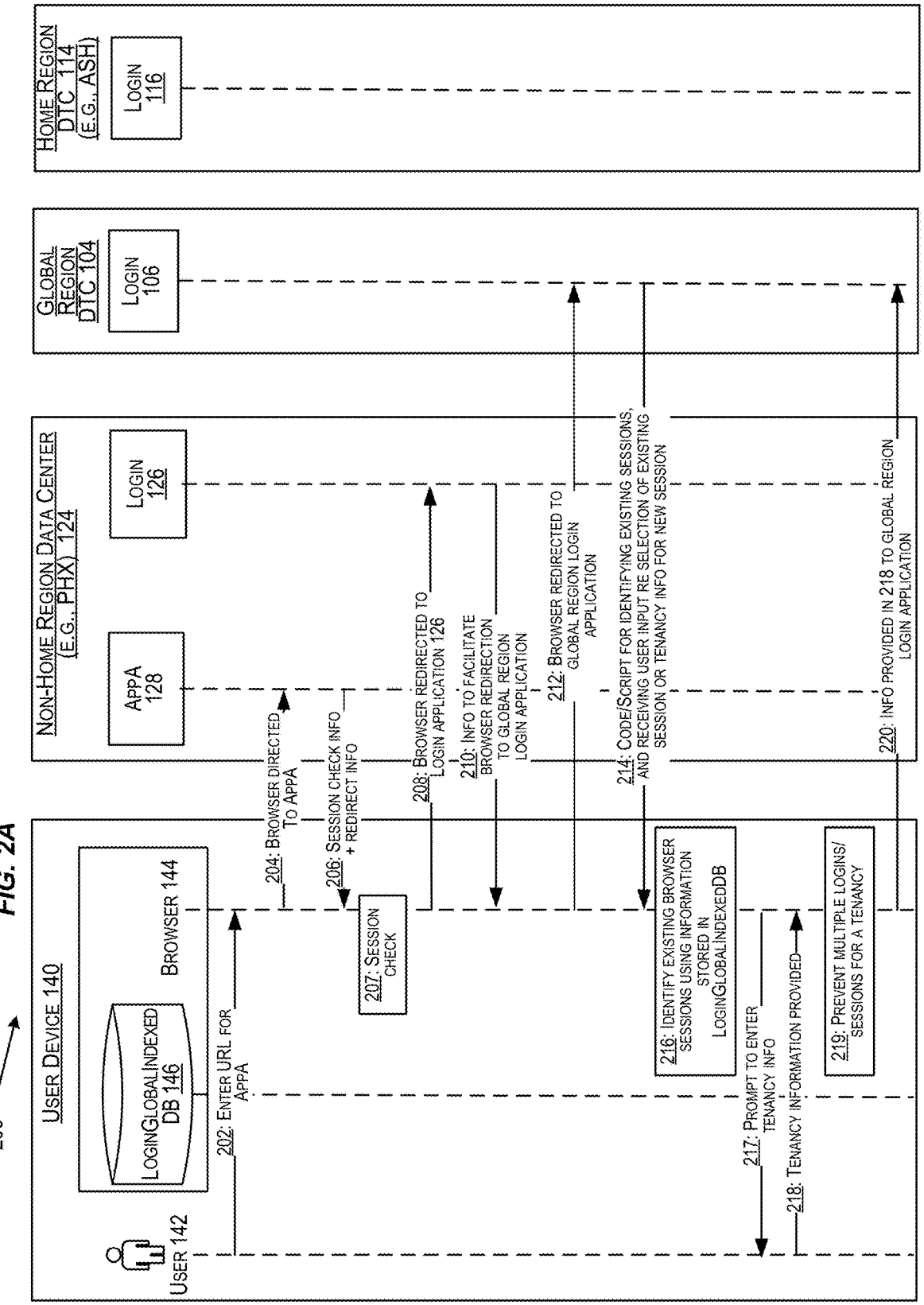

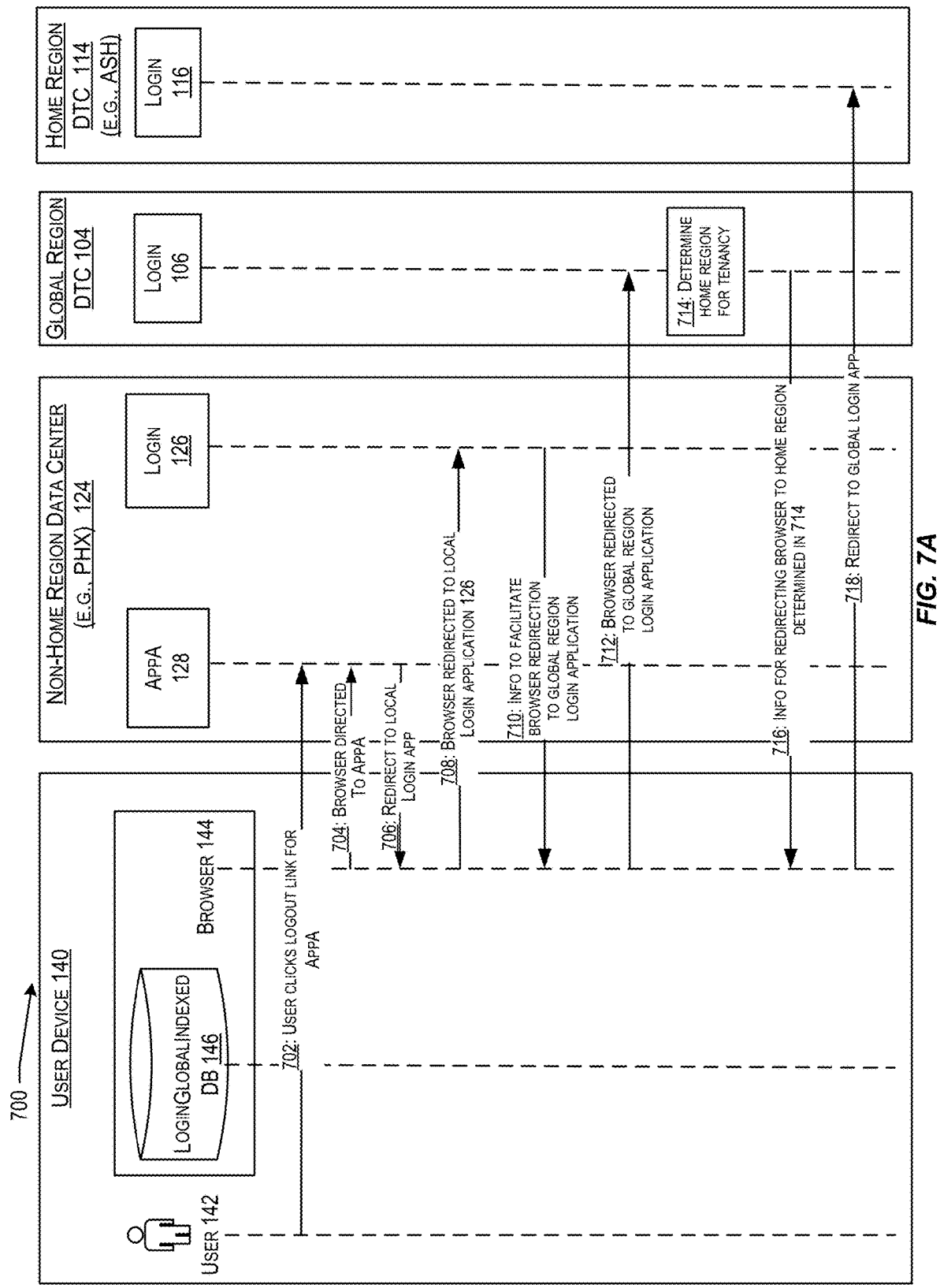

MAINTAINING SESSIONS INFORMATION IN MULTI-REGION CLOUD ENVIRONMENT

CROSS-REFERENCES TO RELATED APPLICATIONS

The present application is a non-provisional of and claims priority to U.S. Provisional Application No. 63/356,884, filed Jun. 29, 2022, the entire contents of which are incorporated herein by reference for all purposes.

The present application claims priority to U.S. Provisional Application No. 63/250,604, filed Sep. 30, 2021, and titled SINGLE SIGN-ON BETWEEN INDEPENDENT SYSTEMS, the entire contents of which are incorporated herein by reference for all purposes.

BACKGROUND

The adoption of cloud services has seen a rapid uptick in recent times. Various types of cloud services are now provided by different cloud service providers (CSPs). The term cloud service is generally used to refer to a service or functionality that is made available by a CSP to subscribing customers on demand, typically using a subscription model, using systems and infrastructure (commonly referred to as cloud infrastructure) provided by the CSP. Typically, the servers and systems included in the CSP-provided cloud infrastructure that is used to provide a cloud service to a subscribing customer are separate from the customer's own on-premise servers and systems. The CSP-provided infrastructure can include compute, storage, and networking resources. Customers can thus avail themselves of cloud services provided by the CSP without having to purchase their own hardware and software resources for the services. Cloud services are designed to provide a subscribing customer easy, scalable, and on-demand access to applications and computing resources without the customer having to invest in procuring the infrastructure for providing the services or functions. Various types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

When a customer or subscriber subscribes to or signs up for one or more cloud services provided by a CSP, a tenancy is created by the CSP for the customer. The tenancy is like an account that is created for the customer. Users associated with the subscribing customer can then access the services subscribed to by the customer under this tenancy. A CSP may have a large number of tenancies. Management of sessions for these tenancies for different customers and associated users is a non-trivial task.

BRIEF SUMMARY

The present disclosure relates generally to cloud computing. More particularly, novel techniques are described that enable, in a multi-region cloud environment, information regarding one or more tenancy sessions that a network access program (e.g., a browser) participates in to be efficiently stored in a centralized location. The centrally-stored sessions information can then be used for various purposes such as for restricting the number of tenancy sessions using a network access program, sessions cleanup, and other sessions-related tasks. Various embodiments are described herein to illustrate various features. These embodiments include various methods, systems, non-transitory computer-readable storage media storing programs, code, or instructions executable by one or more processors, and the like.

The centrally stored sessions information can then be used for various purposes. For example, the centrally stored tenancy sessions information can be used for controlling and regulating the creation of new tenancy sessions via the network access program. In certain implementations, the centrally stored sessions information is used to prevent the network access program from opening multiple sessions for the same tenancy. In such implementations, for a particular tenancy, the network access program is allowed to have only one active session for the particular tenancy at a time. Techniques are described that restrict the network access program from participating in multiple logins or sessions for the same tenancy simultaneously. The centrally stored sessions information can also be used for performing sessions cleanup after a session is closed. The techniques described herein thus facilitate improved tenancy sessions management.

To facilitate the central storage of the sessions-related information and the sessions control, a data center in a multi-region cloud environment is designated as a "global region" data center. The global region data center is then inserted into the processing that is performed when a user requests a new login or session to be created for a tenancy using the network access program. The global region data center is also inserted in the processing that is triggered when the user requests that an active tenancy session that the network access program participates in is to be terminated or closed. The global region data center thus has knowledge of the active session that the network access program (e.g., a browser) participates in and can keep the sessions information updated.

In certain implementations, a global region data center receives information regarding a request to access an application using a browser executing on a user device. The global region data center communicates to the user device, a first set of instructions for execution at the user device. The global region data center receives from the user device and due to execution of the first set of instructions on the user device, a request to log into a first tenancy via the browser, where the browser does not have an existing session for the first tenancy. The global region data center determines a home region for the first tenancy. The global region data center then redirects the browser to a home region data center in the identified home region, wherein the home region data center performs processing associated with the request to log into the first tenancy. The global region data center may use information mapping a set of tenancies to their corresponding home regions to determine the home region for the first tenancy.

The first set of instructions is executed by the browser on the user device. In certain implementations, execution of the first set of instructions the browser causes sessions information stored on the user device to be read, the sessions information comprising information identifying one or more sessions that the browser participates in and information identifying a tenancy for each session in the one or more sessions. In certain implementations, the sessions information is stored by the browser in a data store associated with the global region data center. For example, the data store can be an IndexedDB database associated with an application hosted by the global region data center.

In certain implementations, execution of the first set of instructions by the browser further causes information to be output via the browser regarding the one or more sessions, wherein the information output for a session includes information identifying a tenancy corresponding to that session. Execution of the first set of instructions by the browser further prevents multiple sessions from being opened for a particular tenancy when the one or more sessions includes a session associated with the particular tenancy. Execution of the first set of instructions by the browser also enables input to be received identifying the first tenancy.

In certain implementations, the global region data center receives information indicative of a login into the first tenancy and creation of a new session for the first tenancy. The global region data center causes sessions information stored on the user device to be updated to include information regarding the new session, wherein the sessions information comprises information identifying any sessions that the browser participates in. The information regarding the new session may include information identifying the first tenancy.

In certain implementations, the global region data center receives information regarding a request to log out of the application accessed via the new session created for the first tenancy. The global region data center then redirects the browser to the home region data center in the identified home region for the first tenancy. The global region data center receives a redirect of the browser after invalidation of the new session by the home region data center and causes the sessions information stored on the user device to be updated by removing the information regarding the new session from the sessions information. Causing the sessions information stored on the user device to be updated can include communicating, by the global region data center to the user device, a second set of instructions for execution by the browser on the user device, wherein the second set of instructions when executed by the browser causes the information regarding the new session to be removed from the sessions information. In certain implementations, execution of the second set of instructions by the browser further causes processing to be performed at the user device comprising: from the sessions information stored on the user device, identifying a set of one or more applications accessed using the new session, and performing a logout for each application in the set of applications.

In certain implementations, the home region data center validates the request to log into the first tenancy using one or more identity and access management artifacts stored by the home region data center for the first tenancy, and upon successful validation, facilitates logging into the first tenancy and creation of the new session.

In certain implementations, a non-transitory computer-readable medium is provided that stores computer-executable instructions that, when executed by a computer system of a global region data center, cause the global region data center to perform processing comprising: receiving, by the global region data center, information regarding a request to access an application using a browser executing on a user device; communicating, by the global region data center to the browser, a first set of instructions for execution by the browser; receiving, by the global region data center from the browser and due to execution of the first set of instructions by the browser, information identifying a first tenancy; redirecting, by the global region data center, the browser to a home region data center in a home region for the first tenancy; receiving, by the global region data center, information indicative of a first tenancy login and creation of a new session for the first tenancy login; and causing, by the global region data center, sessions information stored on the user device to be updated to include information regarding the new session, wherein the sessions information comprises information identifying one or more sessions that the browser participates in. The processing may further comprise, responsive to a log out from the first application, causing, by the global region data center, the sessions information stored on the user device to be updated by removing the information regarding the new session from the sessions information. The sessions information may be stored by the browser in a data store associated with the global region data center.

In certain implementations, a system is provided comprising one or more computer systems. The one or more computer systems may be configured to perform processing comprising: receiving a browser redirect responsive to a request to access an application using the browser executing on a user device; receiving, from the browser, information identifying a first tenancy for a new login using the browser; redirecting the browser to a home region data center in a home region for the first tenancy; receiving information indicative of a first tenancy login and creation of a new session for the first tenancy; and causing information to be stored by the browser indicative of the new session and the associated first tenancy.

The foregoing, together with other features and embodiments will become more apparent upon referring to the following specification, claims, and accompanying drawings.

BRIEF DESCRIPTION OF THE DRAWINGS

FIGS. 2A and 2B depict a simplified flowchart depicting processing involving a global region data center according to certain embodiments.

FIGS. 7A and 7B depict a simplified flowchart depicting processing performed during a logout operation according to certain embodiments.

DETAILED DESCRIPTION

Figure 1:
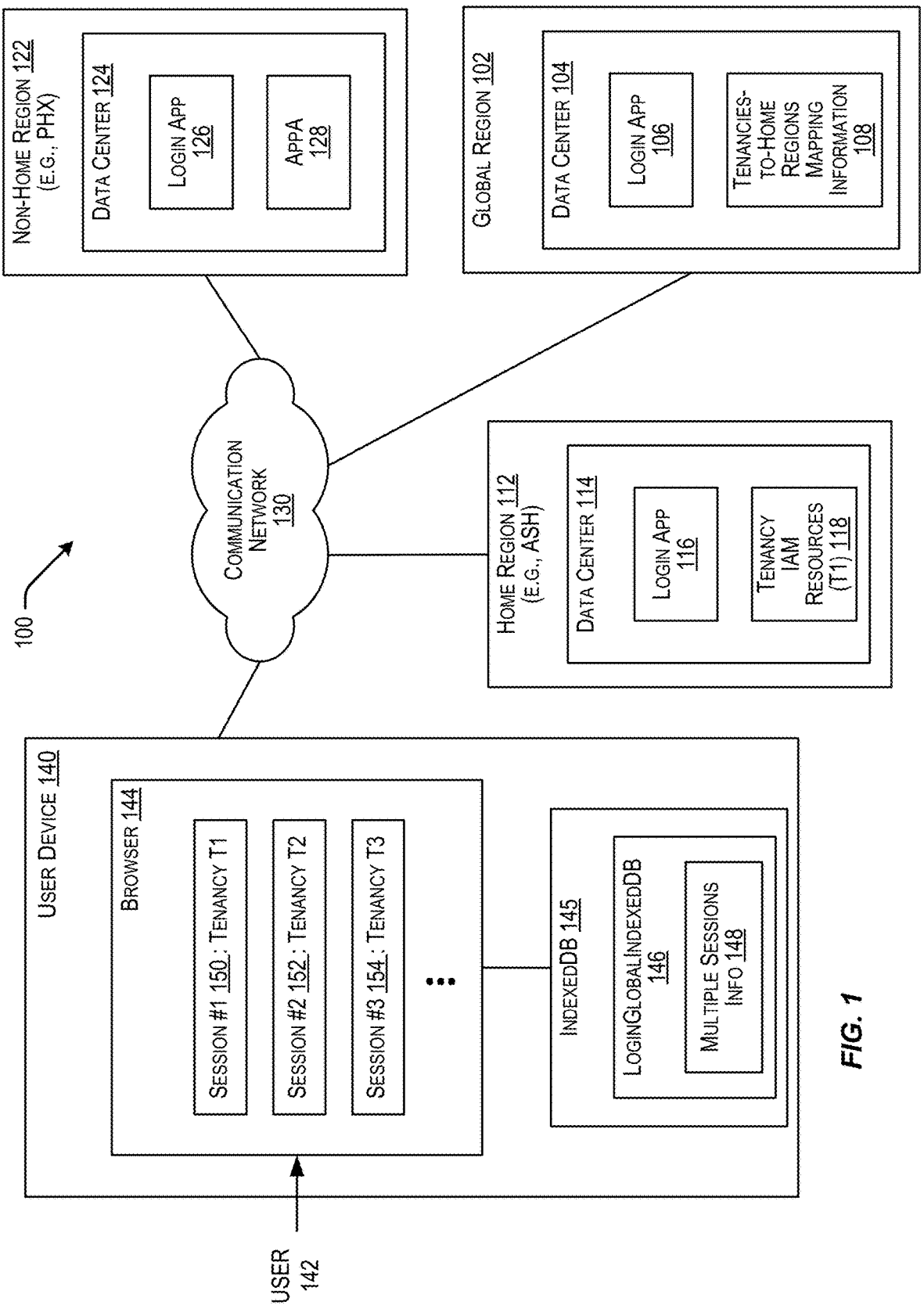
FIG. 1 is a simplified block diagram of a distributed multi-region environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to cloud computing. More particularly, novel techniques are described that enable, in a multi-region cloud environment, information regarding one or more tenancy sessions that a network access program (e.g., a browser) participates in to be efficiently stored in a centralized location. The centrally stored sessions information can then be used for various purposes. For example, the centrally stored tenancy sessions information can be used for controlling and regulating the creation of new tenancy sessions via the network access program. In certain implementations, the centrally-stored sessions information is used to prevent the network access program from opening multiple sessions for the same tenancy. In such implementations, for a particular tenancy, the network access program is allowed to have only one active session for the particular tenancy at a time. Techniques are described that restrict the network access program from participating in multiple logins or sessions for the same tenancy simultaneously. The centrally-stored sessions information can also be used for performing sessions cleanup after a session is closed. The techniques described herein thus facilitate improved tenancy sessions management.

To facilitate the central storage of the sessions-related information and the sessions control, a data center in a multi-region cloud environment is designated as a "global region" data center. The global region data center is then inserted into the processing that is performed when a user requests a new login or session to be created for a tenancy using the network access program. The global region data center is also inserted in the processing that is triggered when the user requests that an active tenancy session that the network access program participates in is to be terminated or closed.

In certain implementations, all new tenancy login and session creation requests initiated using the network access program are forwarded to the global region data center. The global region data center is responsible for determining a home region for the particular tenancy for which a login is requested, and then for efficiently directing the request to a data center in the determined home region for session setup and login-related processing. After a successful session has been created for the tenancy by the data center in the home region, the global region data center receives information about the newly created tenancy session. The global region data center then causes information about the newly created tenancy session to be centrally stored.

In certain implementations, this central location is on a client-side device. For example, the sessions information is stored on a device that executes the network access program. For example, the sessions information may be stored in a database associated with the network access program (e.g., a browser) used to log into the tenancy for which the session is created. Due to the global region data center being inserted into the processing for all tenancy login requests initiated using a network access program, the global region data center is aware of all the tenancy sessions that the network access program participates in and is able to cause information for all the tenancy sessions to be stored in the central location, such as in the in-browser database.

This centrally stored sessions information can then be used for various sessions management functions. For example, using this centrally stored sessions the global region data center can control creation of new tenancy sessions such that, at any given time, at most one session is allowed for a tenancy using the network access program (e.g., a browser). In certain implementations, an application (referred to as the global login application) is provided at the global region data center that is configured to perform processing for identifying a home region for a tenancy, directing a user request to a home region data center, causing information related to multiple tenancy logins and associated sessions for a user to be stored in the centralized location, and controlling logins and sessions for a tenancy. The centrally stored sessions information can also be used to perform session management and cleanup after a user decides to log out of a session and the session is terminated.

As used herein, references to "network access program" refer to an instance of a network access program executed by a computer system or device, where the instance can be used to access content stored in a distributed network. A browser is a non-limiting example of a network access program. As used herein, references to a "browser" refer to an instance of a browser executed by a computer system or device. Examples of browsers include various versions of Microsoft Internet Explorer (IE), Microsoft Edge, Google Chrome, Mozilla Firefox, Apple Safari, and others.

As indicated above, a CSP is responsible for providing the infrastructure and resources that are used for providing cloud services to subscribing customers, where the CSP-provided resources can include hardware and software resources. These resources can include, for example, compute resources (e.g., computer systems, virtual machines, containers, applications, processors), memory resources (e.g., databases, data stores), networking resources (e.g., routers, load balancers), identity and access management resources, and other resources. The resources provided by a CSP for providing a set of cloud services to subscribing customers are typically organized into data centers, each data center comprising one or more computing systems or host machines. A data center may be configured to perform processing for providing one or more cloud services. The CSP is responsible for equipping and configuring each data center with compute, memory, and networking and resources that are used to provide the cloud services.

A CSP may provide one or more data centers depending upon the number of subscribing customers and based upon the locations of the customers. Data centers provided by a CSP may be hosted in different geographical regions. A region may refer to a particular geographic area and may be identified by a region name. Regions are generally independent of each other and can even be separated by vast distances, such as across countries or even continents. Examples of regions for a CSP may include US West, US East, Australia East, Australia Southeast, and the like. In certain implementations, a collection of regions is referred to as a realm. A realm can include one or more regions. Accordingly, a CSP may provide a realm comprising one or more regions, with each region including one or more data centers.

Each data center is thus associated with a region. A CSP may deploy one or more data centers in a region, where the data centers are located within some certain geographic area (e.g., a city) within the region. For example, a particular CSP may have multiple regions such as US West region, US East region, Australia East region, Australia Southeast region, and the like. The CSP may deploy one or more data centers in each region, such as in a city within the region. For example, one or more data centers for the US West region may be located in San Jose, California; data centers for the US East region may be located in Ashburn, Virginia; one or more data centers for the Australia East region may be located in Sydney, Australia; one or more data centers for the Australia Southeast region may be located in Melbourne, Australia; and the like. The data centers in two different regions may provide the same or a different set of cloud services and resources to subscribing customers.

In certain implementations, in order to provide high availability to customers and for disaster recovery purposes, a region may comprise one or more availability domains, with an availability domain including one or more data centers. Availability domains within a region are isolated from each other, are made fault tolerant, and are architected in such a way that data centers in multiple availability domains in a region are very unlikely to fail simultaneously. For example, the availability domains within a region may be structured such that a failure at one availability domain within the region is unlikely to impact the availability of data centers in other availability domains within the same region.

When a customer or subscriber subscribes to or signs up for one or more cloud services provided by a CSP, the CSP creates a tenancy for the customer. The tenancy is like an account that is created for the customer. Users associated with the customer can access the services subscribed to by the customer under the tenancy created for the customer (also referred to as the customer tenancy). In certain implementations, a tenancy for a customer exists in a single realm and the customer and associated users can use the tenancy to access data centers in the regions that belong to that realm. For example, a Company may subscribe to IaaS services provided by a CSP. The Company can then deploy resources (e.g., virtual machines, databases, applications) using the IaaS resources and services provided by the CSP. Users associated with the Company (e.g., developers within the Company) can then access these resources under the tenancy account created for the Company.

In certain embodiments, when a tenancy is created for a subscribing customer, one or more identity and access management (IAM) artifacts are created for and associated with the tenancy. The IAM artifacts may include, for example, credentials used to log into the tenancy (referred to as login credentials), certificates, keys, and the like. For users associated with the customer tenancy, the IAM artifacts may include login credentials for those users such as user login names and associated password, and the like. The IAM credentials may be used for authorizing a user when the user wants to log into the tenancy and set up a tenancy session. The IAM credentials may also be used to determine resources that a user can access under the customer tenancy and the scope of the access.

As used herein, a user associated with a tenancy or a user associated with a customer refers to a digital user (as opposed to a physical user), where a digital user is usually characterized by a user login name, user login credentials, etc. A physical user may be associated with one or more digital users for the different tenancies.

In order to access a protected resource (e.g., an application) under a customer tenancy, a user associated with the customer tenancy (also referred to as a user associated with the customer) has to typically first log into the tenancy using one or more IAM artifacts associated with and stored for the tenancy for the user. The login processing may be performed by an IAM application (referred to herein for simplicity as a "login application"). Login-related processing performed by the login application may involve validating the user using one or more IAM artifacts (e.g., using user login credentials), performing authentication and authorization processing, and upon successful validation, allowing the user to log into the tenancy and creating a new session for the tenancy for the user. The user can then access the protected resource via the created session. If the session is created using a network access program such as a browser, it is also referred to as a browser session for the tenancy. In certain implementations, once a session (e.g., a browser session) has been created for the user for a tenancy, the user can access additional resources for the tenancy using the same session. In certain implementations, single sign-on (SSO) processing is used to enable the user to access other resources using the existing session. SSO enables the user to access additional resources via the session without having to enter login credentials each time.

In certain implementations, in a multi-region cloud environment, when a tenancy is created for a customer by the CSP, the tenancy is associated with a particular region from among the multiple regions. This region is referred to as the "home region" for the customer tenancy. Typically, for a customer, from among the many regions in which the CSP has data centers, a region with one or more data centers that is geographically proximal to the customer (e.g., geographically close or proximal to the users associated with the customers who will be using the subscribed-to cloud services) is chosen as the home region for that customer's tenancy. This is because geographical proximity between a data center and users serviced by that data center lends to lower latency (because using geographically nearby resources is faster and more efficient than using distant resources), more efficient use of resources, and faster and more reliable services being provided to the customer users. As a CSP's customer base grows in different geographical regions, the CSP generally builds data centers in those regions to scale for the increased demand for its services while keeping the data centers serving customer users proximal to the those users.

For example, for a customer with associated users located in California, the US West Coast region may be configured as the home region for the customer tenancy and one or more data centers in US West Coast Region (e.g., a data center located in San Jose, California) may be configured as the home region data centers for that customer tenancy. As another example, for a customer with associated users located in Atlanta, Georgia, the US East Coast region may be configured as the home region for the customer tenancy and a data center in that region (e.g., a data center in Ashburn, Georgia) may be configured as the home region data center for the customer tenancy.

The home region and the home region data center associated with a tenancy has special significance for the tenancy. In some implementations, the IAM artifacts associated with a tenancy, including IAM artifacts for users associated with the tenancy, are stored in a home region data center in the home region designated for that tenancy. As a result, processing involving these IAM artifacts, such as for login-related processing and session setup, is restricted to IAM applications deployed at the home region data center (e.g., referred to as home region login application). For example, when a user uses a browser to request a login for a tenancy, the login-related processing is performed at the home region data center for that tenancy using IAM artifacts stored at that home region data center for that tenancy. Upon successful login processing, the setting up of a browser session for the user for that tenancy is also performed by the home region data center. Accordingly, for any processing involving IAM artifacts for a tenancy, the processing typically is performed at a data center (referred to as the home region data center) in the home region for the tenancy.

As indicated above, regions are grouped into realms. In certain implementations, a tenancy for a customer exists in a single realm, where the realm includes the home region associated with the tenancy. Users associated with the customer tenancy can access data centers in all regions within that realm. Accordingly, a user associated with the customer tenancy can access resources (e.g., applications, compute instances, databases, etc.) that are hosted by a home region data center in a home region for the tenancy and also resources hosted by other data centers in other regions (referred to as non-home region data centers) within the realm comprising the home region. However, due to IAM resources for a tenancy being stored at the home region data center for the tenancy, any IAM artifacts-related processing for the tenancy still is performed by the home region data center. Accordingly, while a user associated with the customer tenancy can access a resource from any data center in a multi-region environment including from one or more non-home and/or home region data centers, login-related processing to set up a new session for the tenancy to enable that access still is performed at the home region data center for the tenancy. The processing may be performed by a home region login application executed by the home region data center in the home region.

For example, a realm may comprise multiple regions including: (a) a first region located in Ashburn ("ASH" region), Georgia; (b) a second region located in Phoenix ("PHX" region), Arizona; and (c) others. The ASH region may be denoted as the home region for a customer tenancy "TenancyA" created for "CustomerA." A user associated with TenancyA may use a network access application such as a browser executing on a user device to request access a protected resource (e.g., an application AppA) deployed in a non-home region data center data in the PHX region, which is not the home region for the tenancy. This can be done by entering a URL corresponding to the resource being accessed (e.g., URL corresponding to AppA's end point) in the browser, which causes the browser to be directed to AppA deployed on a data center in the PHX region. If a browser session associated with TenancyA does not already exist for the user, a new session has to be first created for the user for TenancyA, and then the user can access AppA in PHX via the new session using the browser. Assuming a new session is to be created, as part of creating the new session, the user has to first successfully log into TenancyA before a session can be set up. Since the home region for TenancyA is ASH and not PHX where AppA is deployed, the data center in PHX redirects the user's request to access AppA to the home region data center in ASH for login processing. The login-related processing is then performed at a data center in home region ASH. This login-related processing comprises using one or more IAM artifacts associated with TenancyA and the user that are stored at the home region data center associated with TenancyA. After successful login processing by the home region data center in ASH, a new session is created for the user and TenancyA and the browser is then redirected back to the data center in PHX where the AppA resource can be accessed by the user via the newly created session.

There are several technical problems with the above processing flow. The non-home region data center (e.g., the PHX region data center) has to determine the home region for TenancyA and redirect the browser to a data center in the home region for login and session setup-related processing. In order to do this, each data center in the multi-region environment has to store information regarding the various tenancies and their corresponding home regions information (referred to tenancies-to-home-regions mapping information). This information is then used by a data center (e.g., the data center in PHX) to determine the home region and the home region data center for a tenancy and forward the user access request to the home region data center for further processing. Storing the tenancies-to-home-regions mappings information at each data center in every region in a realm is however very inefficient, wasteful of resources, and difficult to manage. Each data center is now required to allocate memory resources to store the tenancies-to-home regions mapping information, which could be quite large in size. Additionally, each data center is now burdened with determining the home region for a request and thus has to allocate compute resources for performing this processing. Further, managing the tenancies-to-home regions mapping information and keeping it updated and in synchronization can be very time consuming, error prone, and difficult to manage, especially as the number of tenancies increases and the number of data centers increases.

Additionally, there are problems with sessions management. A browser can support multiple sessions with multiple tenancies at the same time. It is however not possible to easily determine what tenancy sessions are already active for the browser. This is because information regarding the multiple active sessions that a browser participates in are stored in isolation and independent of each other. There is no centralized way to store information regarding the different sessions such that an entity can easily determine information regarding all the browser tenancy sessions in an easy manner. For example, the same browser can be used to log into multiple tenancies, such as TenancyA, TenancyB, TenancyC, etc. and the browser may have multiple simultaneous active sessions open for the multiple tenancies. Information regarding these multiple sessions is not stored in a centralized location from where it can be easily accessed and checked to determine whether a session with a particular tenancy already exists or whether a new session is warranted. Due to this, it is possible that a new tenancy browser session is created for a tenancy in response to the user request even though a session already exists for the same tenancy. This can result in a browser participating in multiple sessions with the same tenancy, which can lead to chaos and confusion. Management of these multiple sessions can become complicated. This could also pose a security risk, especially when the user is unaware of the multiple sessions.

The present disclosure describes techniques for solving the above-mentioned problems. In certain implementations, a novel architecture and associated processing is provided for storing information regarding one or more tenancy sessions that a network access program (e.g., a browser) participates in a centralized location. The centrally stored sessions information can then be used for various purposes. For example, the centrally stored tenancy sessions information can be used for controlling and regulating the creation of new tenancy sessions via the network access program. In certain implementations, the centrally stored sessions information is used to prevent the network access program from opening multiple sessions for the same tenancy. In such implementations, for a particular tenancy, the network access program is allowed to have only one active session for the particular tenancy at a time. Techniques are described that restrict the network access program from participating in multiple logins or sessions for the same tenancy simultaneously. The centrally stored sessions information can also be used for performing sessions cleanup after a session is closed. The techniques described herein thus facilitate improved tenancy sessions management.

In certain embodiments, the ability to centrally store the sessions-related information for various tenancy sessions that a browser participates in is facilitated by a "global region" data center, which is inserted into the new tenancy login and session creation-related, and session logout-related processing. A particular data center is predesignated as a "global region" data center. All requests initiated from a network access program (e.g., a browser) for a new tenancy login and associated session creation are forwarded to the global region data center. The global region data center is responsible for determining a home region for the tenancy for which a login is requested, and then directing the user request to the a home region data center in the determined home region for login and session setup-related processing.

Due to the global region data center being inserted in all new tenancy logins and session creations, and session logouts, the global region data center has information regarding the multiple browser sessions for the different tenancies. The global region data center is responsible for causing information regarding these multiple browser sessions related to multiple tenancies to be stored in a centralized location. For example, the information may be stored in a database associated with a browser used to log into the multiple tenancies. The sessions information can also include, for each session, information identifying the tenancy, information about the user, information about the various applications (or resources in general) accessed by via the session, and other session-related information.

The sessions information is stored in a centralized location from where it can be easily accessed, for example, by the global region data center. This sessions information can then be used for various purposes, such as for various sessions management related functions, as described below in more detail. For example, the sessions information can be used to restrict the browser to participate in at most one session for each tenancy thereby avoiding multiple sessions for the same tenancy.

As another example, the sessions information can be used to gracefully close a session and perform session-related cleanup. Since the sessions information can also include, for each session, information about the various applications (or resources in general) via the session, graceful logouts from those applications can also be performed when the session is closed. For example, when a user indicates an intent to log out of an application, which the user is accessing via a tenancy login and an associated session, the global region data center is inserted in the logout processing to close the associated session and also to gracefully log the user out of all applications associated with that session. The global region data center can query the centrally stored sessions information to determine information about all active sessions that the browser participates in and identify the particular session to be closed. From the centrally stored sessions information, the global region data center can identify the session to be terminated and all the applications accessed by via that session. The global region data center can then cause the user to be gracefully logged out of these applications.

In certain implementations, the global region data center causes the sessions information to be stored client-side. For example, the sessions information is stored on a device that executes the network access program (e.g., the browser). For example, the sessions ingo may be stored in a database associated with the browser used for the multiple tenancy logins. In certain implementations, the information is stored in an IndexedDB in-browser data store associated with the URL corresponding to the global region data center or with the global login application deployed on the global region data center. The in-browser database provides a single one-stop centralized location for storing information about the multiple active browser sessions for the multiple tenancies.

The insertion of the global region data center in the login and session setup processing provides several technical benefits. The global region data center is now aware of all the active tenancy sessions that a browser participates in and can thus stores the sessions information in the centralized location. Further, unlike previously, only the global region data center is now burdened with performing processing related to identifying a home region and a home region data center for a tenancy responsive to a user request to log into a tenancy in order to access a protected resource (e.g., a protected application). The other data centers in the realm (i.e., the non-global region data centers) are now no longer burdened with this task. As a result, the non-global region data centers no longer have to store the tenancies-to-home regions mapping information. This frees up both compute and storage resources on the non-global region data centers to perform other tasks. Identification of the home region and the home region data center is consolidated at the global region data center. A non-global region data center is configured to just redirect all requests to the global region data center for further processing. The non-global region data centers can do this by redirecting all such requests to a URL endpoint representing the global region data center or the global region login application. In certain implementations, one or more global region data centers may be preconfigured for a realm and the tenancies-to-home regions mapping information made available to or stored by these data centers. All the data centers in a realm may be made aware of the global region data centers that have been preconfigured for the realm.

The stored sessions information can be used for various purposes. As one example, the global region data center uses this information to restrict the ability to have multiple simultaneously session for the same tenancy using a network access program such as a browser. For example, upon receiving a new tenancy login request for a user from a browser, the global region data center can read the sessions information stored in the in-browser database and determine the current active tenancy logins and sessions that the browser participates in. If the user is requesting a new login into a tenancy for which an active browser session already exists, the user is prevented from having a separate additional login and additional session for the same tenancy. In this manner, in certain implementations, only one active login and associated session for a tenancy is permitted for the browser, i.e., the browser is not allowed to have multiple sessions or multiple logins for the same tenancy simultaneously. In this manner, the global region data center can restrict the number of simultaneous tenancy logins and associated sessions that the browser participates in. This significantly eases sessions management for sessions that the browser participates in.

In some alternative embodiments, multiple logins and sessions for the same tenancy may be allowed. In these implementations, the sessions information is used to notify and make the user aware of any existing active tenancy logins and associated sessions. The user may then decide, instead of requesting an additional login and session to access a protected resource, whether to use an already existing session to access the resource. SSO procedures may be used to enable the user to access the protected resource using the existing tenancy login and session. Alternatively, the user may still want to have an additional login and separate session for the same tenancy, and the additional login and session may be allowed. Even in such situations, the centrally stored sessions information is useful for making the user aware of all the existing tenancy logins and sessions that the browser already participates in.

For example, in response to a user request to access AppA under a tenancy TenancyA, processing may be performed to identify existing tenancy logins for the user and associated sessions. Upon determining, from the client-side stored sessions information, that a browser session already exists for TenancyA, information may output to the user identifying this existing session. The user may then be given the option to use the existing session and access AppA via that existing session. If the user selects the option to connect to the existing session, then a single-sign on (SSO) process may be used to enable the user to access AppA under the existing session.

Figure 12:
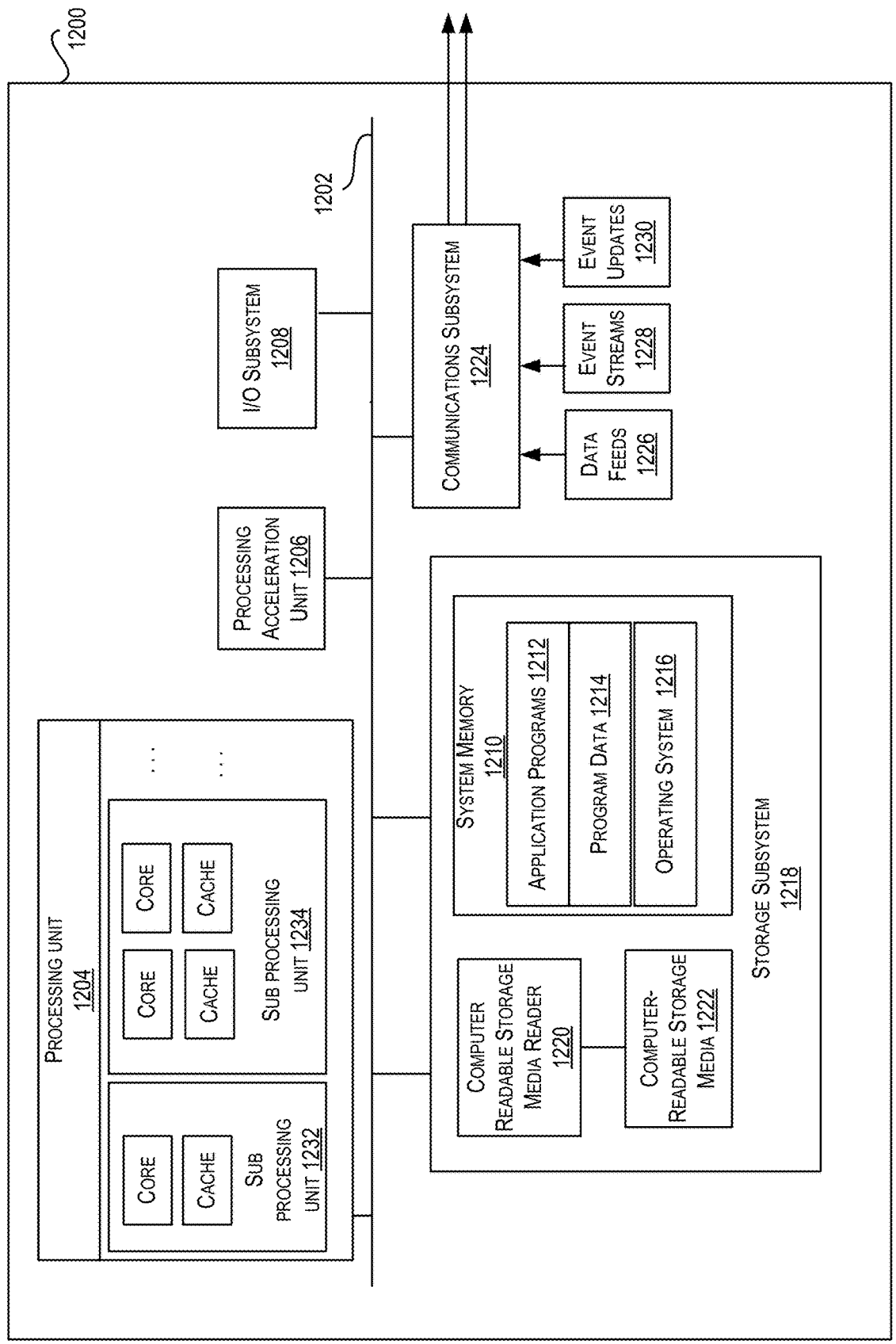
FIG. 12 is a block diagram illustrating an example computer system, according to at least one embodiment.

The term "data center," as used in this disclosure, refers to one or more computer systems that together are used to implement the data center and to perform processing for one or more services provided by the data center. For example, a home region data center refers to one or more computer systems that are used to implement a data center in a home region. For example, a global region data center refers to one or more computer systems used to implement the global region data center. A computer system that makes up a data center can include one or more processors, and one or more memories capable of storing instructions that are executed by the one or more processors. An example of such a computer system is depicted in FIG. 12 and described below.

FIG. 1 is a simplified block diagram of a distributed multi-region environment 100 incorporating an exemplary embodiment. Distributed environment 100 depicts data centers in multiple regions that are communicatively coupled to each other via communication network 130. For sake of example, the regions depicted in FIG. 1 include a global region 102, a region 112 that is a home region for a particular tenancy, and a region 122 that is a non-home region for that tenancy (i.e., a region that is not the home region for the tenancy). For purposes of describing various features, it is assumed that non-home region 122 is Phoenix, USA, (identified by label "PHX"), and home region 112 is Ashburn, USA (identified by label "ASH").

Each of the regions depicted in FIG. 1 may include one or more data centers comprising infrastructure provided by a CSP for providing one or more cloud services on a subscription basis to subscribing customers. The infrastructure in a data center may include compute, memory, and networking resources provided by the CSP. For example, in FIG. 1, global region 102 includes a data center 104 (also referred to as global region data center 104), home region 112 includes a data center 114 (also referred to as home region data center 114), and non-home region 122 includes a data center 124 (also referred to as non-home region data center 124).

The data centers in the various regions may be communicatively coupled with one another and to user device 140 via communication network 130 that facilitates communications between the various computing systems. Communication network 130 can be of various types and can include one or more communication networks such as one or more public networks. Examples of communication network 130 include, without restriction, the Internet, a wide area network (WAN), a local area network (LAN), an Ethernet network, a wired network, a wireless network, and the like, and combinations thereof. Different communication protocols may be used to facilitate communications over communication network 130 including both wired and wireless protocols such as IEEE 802.XX suite of protocols, TCP/IP, IPX, SAN, AppleTalk®, Bluetooth®, and various other protocols. In general, communication network 130 may include any infrastructure that facilitates communications between the various systems depicted in FIG. 1.

In the embodiment depicted in FIG. 1, each data center hosts an identity and access management (IAM) application (referred as to as a login application in FIG. 1) that is configured to perform identity and access management functions such as login processing, sessions creation, authentication/authorization operations, and the like. In FIG. 1, global region data center 104 includes a login application 106 (also referred to as a global login application 106), home region data center 114 includes a login application 116 (also referred to as home region login application 116), and non-home region data center 124 includes a login application 126.

As described above, when a tenancy account is opened for a customer, a particular home region from among the multiple regions is designated as the home region for that tenancy. Typically, the identity and access management (IAM) artifacts configured for that tenancy are stored in a data center in the home region for that tenancy. These IAM artifacts may include, for example, login credentials, certificates, keys, etc. These artifacts are then used, for example, for performing login processing when creating a new session, authentication or authorization functions, and other identity and access management related functions for that tenancy. For example, when a user associated with a tenancy requests access to a protected resource, processing to enable the user to access the resource may involve processing (e.g., tenancy login processing and session creation) that may be performed using the IAM artifacts configured for that tenancy and user and which are stored in a home region data center in the home region for the tenancy.

In FIG. 1, it is assumed that region 112 is the home region for a tenancy T1, and thus IAM resources 118 for tenancy T1 are stored by home region data center 114. A region in a realm can be the home region for multiple tenancies. Also, within a realm, one region can be the home region for a first tenancy, a second different region can be the home region for a second tenancy, and so on. As previously indicated, in general, IAM artifacts and resources for a tenancy are stored in a data center in a home region associated with that tenancy.

Global region data center 104 is configured to perform processing to determine home regions corresponding to different tenancies. In certain implementations, this is facilitated using tenancies-to-home regions mapping information that maps tenancies to their corresponding home regions. For each tenancy, the tenancies-to-home regions mapping information may identify the home region for the tenancy and one or more home region data centers in the home region for the tenancy. Accordingly, as shown in FIG. 1, tenancies-to-home regions mapping information 108 is stored by global region data center 104. In alternative embodiments, tenancies-to-home regions mapping information may be stored in a location that is accessible to global region data center 104. Since the identification of home regions is performed by the global region data centers and not by the other data centers, as depicted in FIG. 1, the other data centers in the various regions in a realm need not store the tenancies-to-home regions mapping information.

One or more resources (e.g., applications) may be hosted by the different data centers. These applications may be accessed and used by users associated with customers that have subscribed to one or more cloud services provided by the CSP that provides the data centers. For example, in FIG. 1, an application "AppA" 128 is deployed at non-home region data center 124 in region 122. For purposes of the example depicted in FIG. 1, it is assumed that region 122 is a non-home region with respect to tenancy T1.

A digital user 142 associated with a customer tenancy can, via a user device 140, access one or more services or resources (e.g., AppA 128) associated with the customer tenancy and provided by the various data centers depicted in FIG. 1. User device 140 could be a computing device such as a laptop, a desktop, a mobile device, and the like. There are various ways in which a user, such as user 142, can access a resource, such as AppA 128. In certain use cases, user 142 may use an application (e.g., a browser) executing on user device 140 to access the resource. For example, in FIG. 1, a browser 144 may be used to access AppA 128. A request to access AppA 128 may be initiated by providing an URL endpoint corresponding to AppA 128 to browser 144, by clicking a link corresponding to AppA 128, and the like. API calls may also be made to access AppA 128.

AppA 128 may be a "protected" resource, where access to AppA 128 is controlled by an IAM application. A user associated with a customer tenancy, such as user 142, is typically identified by a user account or a user principal associated with the user. User 142 can access a protected resource, such as AppA 128, through this user account or user principal. To access a protected resource such as AppA 128 under a particular tenancy using browser 144, the user 142 has to first log into the tenancy. As part of the login-related processing, the user is validated by the IAM application using one or more IAM artifacts associated with that tenancy and the user. Upon successful validation, the user is allowed to log into the tenancy and a browser session is opened or created for that tenancy for the user. The user can then access the protected resource via this session. More details regarding validation and setting up of a new session are provided below in the context of FIGS. 2A and 2B.

Once a session has been created for a user for a particular tenancy, the user may be allowed to access a second resource (e.g., a second application) under the same tenancy using the same existing session using single sign-on (SSO) processing flows. Due to SSO flows, a user does not have to log into the same tenancy multiple times for each new resource to be accessed under that tenancy. Additionally, a user does not have to provide user credentials each time a new resource is accessed. SSO thus improves user experience.

Browser 144 may be used to log into multiple tenancies, and for each tenancy login, an associated browser session is created for that tenancy. For example, there may be multiple browser sessions in in parallel for different tenancies. For example, as shown in FIG. 1, there are three separate sessions 150, 152, and 154, that browser 144 participates in corresponding to tenancies T1, T2, and T3, respectively. In certain browser implementations, the multiple sessions may be opened using multiple tabs of browser 144, each tab supporting a session for a tenancy login. For example, a first tab of browser 144 may correspond to a Session #1 150 for tenancy T1; a second tab in the same browser 144 may correspond to Session #2 152 for tenancy T2; a third tab in browser 144 may correspond to Session #3 154; and so on. Browser 144 may thus support multiple sessions concurrently or in parallel for different tenancy. As described below, techniques are described in this disclosure that prevent browser 144 from having more than one login for the same tenancy.

Browser 144 may be of different types. Commonly used browsers include Google Chrome, Mozilla Firefox, Microsoft Edge. Internet Explorer, Apple Safari, and others. Certain browser implementations may have an associated storage capability. For example, browser 144 has an in-browser storage represented by database 145. Information related to the various endpoints accessed using browser 144 or applications accessed using browser 144 may be stored in database 145 on user device 140 (referred to as client-side storage since saved on the user device). For example, for the multiple sessions that browser 144 participates in, information related to the sessions may be stored in database 145.

Different implementations of database 145 are possible. In the example embodiment depicted in FIG. 1, database 145 is implemented as a client-side, in-browser indexed database IndexedDB 145. An IndexedDB is typically a document database that exists in a sandboxed context (enforced by respecting the same-origin policy) entirely within a browser. The same-origin policy is a security mechanism that restricts how a document or script loaded by one origin can interact with a resource from another origin. An origin is typically defined by the scheme, host, and port of a URL. In certain implementations, two URLs are considered to have the same origin only if the protocol, port (if specified), and host are the same for both, else they are considered to have different origins. Generally, documents retrieved by a browser from distinct origins are isolated from each other and information regarding the distinct origins is isolated when stored in the in-browser database. Accordingly, information stored in IndexedDB 145 for distinct origins is isolated and separated from each other. A first origin cannot access information stored in IndexedDB 145 for a second origin, and the second origin cannot access information stored in IndexedDB 145 for the first origin.

In certain implementations, data is stored in IndexedDB 146 in object stores. Separate object stores within IndexedDB 145 may be used to store information for the different sessions for different origins or tenancies. For example, one object store may be used for storing information related to the global region data center origin, a second object store for storing information related to the home region data center origin, and a third object store for storing information related to the non-home region data center origin. For example, as depicted in FIG. 1, a LoginGlobalIndexedDB data store 146 may correspond to an object store for storing information 148 for global region data center 104. The stored information 148 may include, for example, interactions by browser 144 with global login application 106 deployed in the global region data center 104. The object store corresponding to a particular origin (e.g., LoginGlobalIndexedDB data store 146 corresponding to global region data center 104) can only be accessed by that origin, i.e., by global region data center 104, and not by other origins such as non-home region data center 124 or home region data center 114.

In certain implementations, LoginGlobalIndexedDB 146 functions as the centralized store for storing information regarding the multiple sessions corresponding to multiple tenancies that browser 144 participates in. For example, the information 148 stored in LoginGlobalIndexedDB 146 includes sessions information, which includes information about the multiple browser sessions. As described below, global region data center 104 may cause the session information about the multiple active sessions (e.g., Session #1 150, Session #2 152, and Session #3 154) for browser 144 to be stored as part of information 148 in LoginGlobalIndexedDB 146. In certain implementations, operations or actions on IndexedDB 145, including on object stores within IndexedDB 145 such as LoginGlobalIndexedDB 146, are request-based (e.g., request to open an IndexedDB, request to access an object store, etc.) and executed within a transaction scope.

Processing performed by the different systems depicted in FIG. 1 is described below with reference to FIGS. 2A, 2B, 3, 4A, 4B, 5, 6, 7A, and 7B. FIGS. 2A, 2B, 3, 4A, 4B, 5, 6 depict processing that is triggered when a user uses a network access program to request access to a protected application. For example, in FIG. 1, processing may be triggered when user 142 requests access to protected application AppA 128 using browser 144. The processing involves performing login processing for the user for a tenancy, opening a new session upon successful login processing, and enabling the user to access the requested resource using the newly opened session. FIGS. 7A and 7B depict processing that is triggered when a user opts to log out of an application and the subsequent session closure and cleanup processing that is performed. As described below, global region data center 104 is inserted in both the new tenancy login and session creation processing and in the application log out and sessions closure processing.

Distributed environment 100 depicted in FIG. 1 is merely an example environment incorporating multiple data centers in multiple regions and is not intended to unduly limit the scope of claimed embodiments. Many variations, alternatives, and modifications are possible. For example, in some implementations, distributed environment 100 may have more or fewer systems or components than those shown in FIG. 1, may combine two or more systems, or may have a different configuration or arrangement of systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The systems and data centers depicted in FIG. 1 may be implemented using one or more computer systems, such as the computer system depicted in FIG. 12.

Figure 2B:
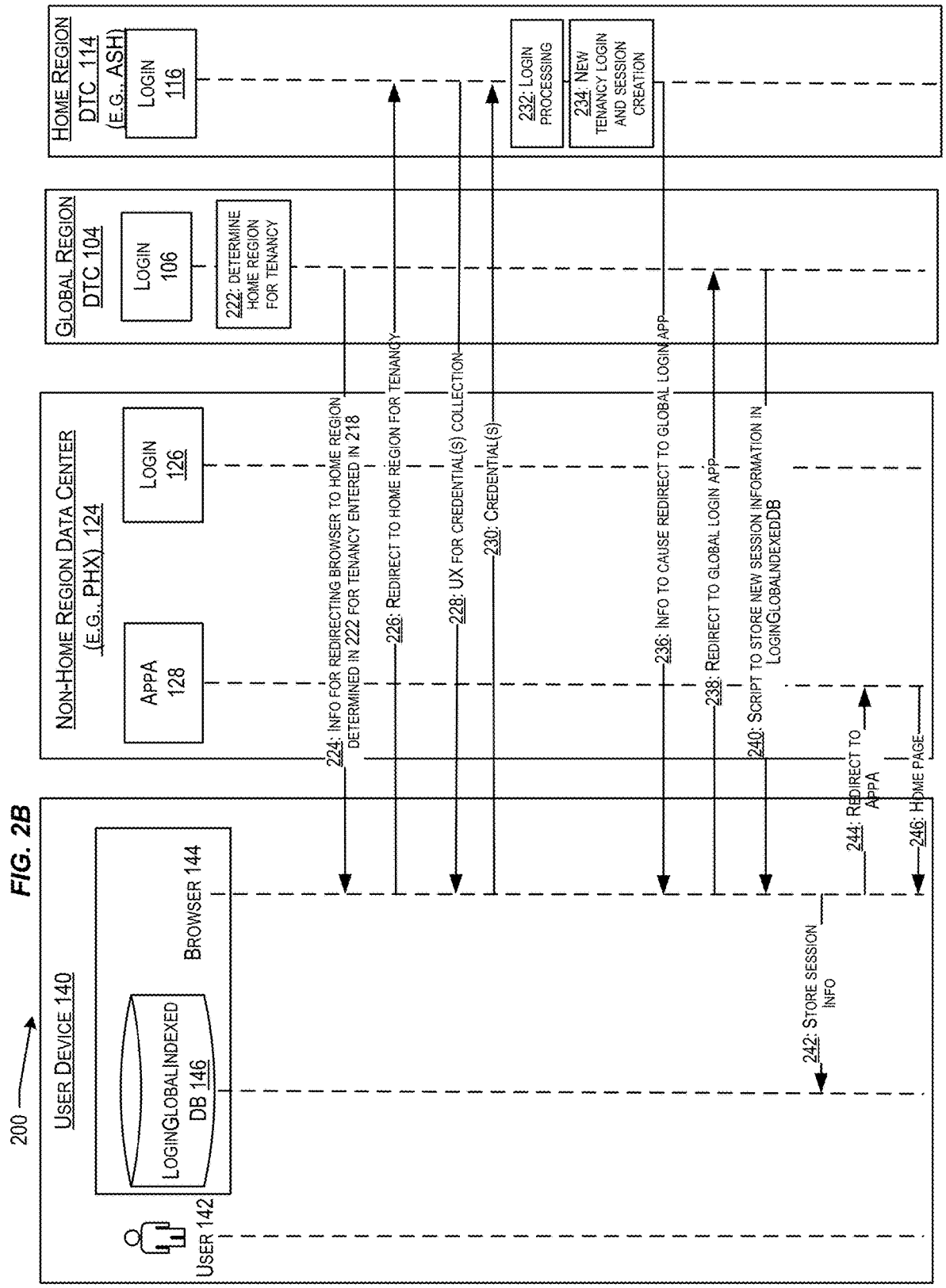

FIGS. 2A and 2B depict a simplified flowchart 200 depicting processing involving a global region data center according to certain embodiments. The processing depicted in FIGS. 2A and 2B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 2A and 2B and described below is intended to be illustrative and non-limiting. Although FIGS. 2A and 2B depict the various processing steps occurring in a particular sequence or order, this is not intended to be limiting. In certain alternative embodiments, the processing may be performed in some different order, or some steps may also be performed in parallel.

The flowchart in FIGS. 2A and 2B shows interactions and communications between the various systems and components depicted in FIG. 1. More specifically, flowchart 200 depicts interactions between browser 144 executing on user device 140, non-home region data center 124, global region data center 104, and home region data center 208.

The processing in FIGS. 2A and 2B may be triggered when user 142, using browser 144 executing on user device 140, requests access to application AppA 128 deployed at non-home region data center 124. Accordingly, processing may begin at 202, when user 142 uses browser 144 to connect to AppA 128. There are various ways in which this can happen. In certain instances, user 142 may provide a URL corresponding to AppA 128 to browser 144. For example, the URL may be entered in an URL input field of browser 144. For example, for AppA 128 deployed in data center 124 in PHX, the URL for accessing AppA 128 may be "AppA.us-phoenix.oraclecloud.com," which may be provided to browser 144. In some instances, the URL for AppA 128 may have been bookmarked in browser 144 and this bookmarked URL may be selected in 202. In some other instances, browser 144 may display a user selectable option (e.g., a link, a button, a drop-down menu) corresponding to AppA 128 and the user selectable option is selected in 202 (e.g., click on a link corresponding to application 128, select AppA 128 from a menu, double click an icon corresponding to AppA 128) to indicate that the user wishes to access AppA 128 using browser 144.

At 204, based upon the endpoint information (e.g., URL information) provided in 202, browser 144 is directed to AppA 128 deployed in region data center 124 in PHX. For example, URL "AppA.us-phoenix.oraclecloud.com" is provided, browser 144 is directed to the endpoint of that URL in data center 124 in the PHX region.

At 206, 207, and 208, processing is performed to check if access to AppA 128 via browser 144 has already been established for user 142 via an existing browser active session. If so, browser 144 is connected to this active and the user can access AppA 128 via this session. If not, browser 144 is redirected to a "local" login application 126 (i.e., a login application in the same data center as AppA 128) for login related processing associated with creating a new session to enable user 142 to access AppA 128 using browser 144.

More specifically, at 206, a message is communicated from AppA 128 to browser 144 that enables processing to be performed at browser 144 to determine if access to AppA 128 via browser 144 has already been established for user 142 via an existing session. In certain implementations, the message communicated in 206 from AppA 128 to browser 144 includes instructions executable by user device 140 (in some implementations, executable by browser 144), such as a piece of code or client-side script (e.g., JavaScript) to perform this check. The message communicated to browser 144 in 206 may also include information identifying an endpoint (e.g., an URL) corresponding to local login application 126 to which browser 144 is to be redirected to upon determining that an active session does not exist that already enables user 142 to access AppA 128. For example, the instructions (e.g., the JavaScript) may contain the redirect URL. The message communicated in 206 from AppA 128 to browser 144 may also include certain parameters extracted from the user access request received by AppA 128 in 204.

At 207, processing is performed by browser 144 to check if access to AppA 128 via browser 144 has already been established for user 142 via an existing browser session. In certain implementations, the instructions (e.g., code or client-side script) received by browser 144 in the message received in 206 are executed on user device 140 (e.g., executed by browser 144) and cause the check to be performed.

In certain implementations, the check may be performed by checking information stored by browser 144 for AppA 128. This information may be stored in a data store (e.g., AppAIndexedDB) corresponding to AppA 128 in IndexedDB 145. For example, as part of the check in 207, this AppA-specific in-browser data store may be checked to see if it contains information (e.g., a JSON Web token (JWT) corresponding to a session and the token has not expired) that identifies an existing browser session for the tenancy that can be used by user 142 to access AppA 128. If so, that active session is used to provide user 142 access to AppA 128. In this case, the processing in FIGS. 2A and 2B ends.

If is it determined in 207 that access to AppA 128 via browser 144 has not already been established for user 142 via an existing session, at 208, browser 144 is redirected to login application 126 (to an IAM application, in general) that is local to AppA 128, i.e., in the same data center as AppA 128. The redirect URL to login application 126 is included in the message received by browser 144 in 206, and this URL is used to redirect browser 144 to login application 126. An example of such a redirect URL for login application 126 in non-home region data center 124 in PHX is "loginApp.us-phoenix.oraclecloud.com".

Login application 126 may be executed by one or more servers in the non-home region data center 124 (e.g., in PHX) and is configured to perform identity and access management-related processing including login processing. In certain implementations, the one or more servers executing login application 126 may sit behind a load balancer whose DNS is "loginApp.us-phoenix.oraclecloud.com".

Login application 126 is configured to direct browser 144 to a global login application hosted by global region data center 104. This is done in 210 and 212, wherein browser 144 is redirected to a data center designated as the global region data center for the realm, and more specifically to a login application (or an IAM application, in general) designated as a global login application and deployed in the global region data center. This is the first instance of the global region data center and the global login application being inserted into the login processing process flow.

More specifically, at 210, a message is communicated from regional login application 126 to browser 144 to facilitate redirection of browser 144 to global login application 106. The message communicated in 210 includes information identifying an endpoint (e.g., URL information) for global login application 106 deployed in the global region data center 104 to which browser 144 is to be redirected. In certain implementations, a "302 redirect response code" is included in the message sent to browser 144 in 210 to facilitate the redirect. A redirect response code is a message sent from a server to a browser telling the browser that a webpage requested by the browser no longer exists at the server and informs the browser that the requested webpage has moved to another URL and the server is redirecting the browser to the webpage at the new location. The URL to which browser 144 is redirected is the URL pointing to login application 106 in global region data center 104. It is to be noted that data center 124 or does not have to do any processing related to identifying a home region and a home region data center for the request.

At 212, browser 144 is redirected to global login application 106 in global region data center 104 using the redirect URL received in 210. In this manner, for any request from browser 144 for a new login and new session, the request is redirected to global login application 106 hosted by global region data center 104. This enables global region data center 104 and global login application 106 to be inserted into the processing of all new login requests.

In certain implementations, a data center may be configured as a "global region" data center by configuring a "global" DNS address for the data center. In certain implementations, a global DNS address is one where the DNS address does not include any geographic region-specific identifier. An example of such a DNS address is "oci.oraclecloud.com," which may be associated with global region data center 104. As can be seen, there is no specific region denoted in this DNS address.

Global DNS addresses may also be configured for and associated with specific applications hosted by the global region data center, and which are to be treated as global or region-agnostic applications. For example, a global DNS address such as "loginApp.oci.oraclecloud.com" may be configured for global login application 106. As can be seen, this DNS address also does not have any region-specific identifier. This is to be contrasted with a DNS address such as "loginApp.us-phoenix.oraclecloud.com" associated with login application 126 deployed in the PHX data center 124, or "AppA.us-phoenix.oraclecloud.com" associated with login application 126 deployed in the PHX data center 124.

In certain implementations, a global DNS address for a global region data center maps to a DNS address for a specific regional data center that has been configured as the global region data center for that realm. Likewise, the global address for a global login application also maps or translates or resolves to a specific DNS address of a login application that is configured as a global login application and deployed at the global region data center. In certain embodiments, the particular data center that is selected as the global region data center and to which browser 144 is redirected to in 212 depends upon the geographical location of user 142. Preferably, a data center that is geographically close to the physical location of user device 140 is preconfigured as the global region data center for servicing that user to reduce latency. For example, if user device 140 associated with user 142 is located in London, UK, then a data center in London that is preconfigured to serve as a global region data center may be selected to serve as a global region data center for a request received from the London-located user and browser 144 is redirected to this global region data center in 212. As another example, if user device 140 associated with user 142 is in Seattle, Washington, then, in 212, browser 144 may be redirected to a data center in the Seattle area that is preconfigured to serve as a global region data center to process a request received from the Seattle-located user. Accordingly, in certain implementations, multiple data centers may be preconfigured as global region data centers for a realm, and the one that is geographically closest to user device 140 associated with user 142 may be the one to which browser 144 is redirected to in 212.

In certain implementations, as part of the processing in 212, the global DNS for the login application 126 is resolved or translated to a specific IP address of the login application and browser 144 redirected to that translated IP address. For example, the global DNS address "loginApp.oci.oraclecloud.com" may be resolved or translated to a IP address corresponding to a particular regional login application such as "loginApp.us-<local>.oraclecloud.com", where <local> is PHX or some other data center, and browser 144 is redirected to that global login application pointed to by that translated-to URL.

In certain implementations, information regarding the user access request such as information identifying AppA 128 (e.g., URL for AppA 128), information identifying user 142, etc. may be included in the messages communicated in 208, 210, and 212. For example, URL "AppA.us-phoenix.oraclecloud.com" may be included in these messages. This is done so that the various entities involved in the process flow are aware of where browser 144 is to be redirected to upon successful completion of the processing depicted in FIGS. 2A and 2B.

At 214, the global login application 106 sends a message to browser 144, where the message includes instructions (e.g., a piece of code or a client-side script (e.g., JavaScript)), which when executed by browser 144, causes the processing described below for 216, 217, 218, 219, and 220 to be performed.

At 216, the instructions (e.g., code or script) received in 214 are executed by browser 144 on user device 140. In certain implementations, execution of the instructions results in the following operations being performed:

(a) Information stored on the user device 140 is read to identify existing active sessions that browser 144 is participating in for various tenancies. In certain implementations, information regarding these sessions is stored in LoginGlobalIndexedDB 146, which is an object store associated with the global region data center origin. The process of storing the information in LoginGlobalIndexedDB 146 is described below with respect to blocks 240 and 242 depicted in FIG. 2B and described below. Since the message is received from global login application 106, the information stored in LoginGlobalIndexedDB 146 can be read without violating the same origin policy. Accordingly, in 216, the information stored in LoginGlobalIndexedDB 146 is read to identify all existing active sessions that browser 144 participates in. In certain embodiments, for each active session, the information stored in LoginGlobalIndexedDB 146 may include information identifying a session identifier, a tenancy associated with the session and corresponding to a tenancy login, and information identifying one or more applications that have been accessed via that session, and other information.

(b) Information regarding the identified active sessions read from the LoginGlobalIndexedDB 146 is then output or displayed to the physical user via browser 144. In certain implementations, a graphical user interface may be displayed to the physical user (physical user associated with digital user 142) by browser 144 identifying the active sessions. For each session, the information that is output may include information identifying a session identifier, a tenancy associated with the session, and information identifying one or more applications accessed via that session, and other information. In this manner, the physical user is made aware of all the active existing sessions that browser 144 participates in.

(c) The physical user is then given the choice of connecting to an existing session, or requesting a login into a new tenancy for a digital user and opening a new session for the new login. Subsequent processing is dependent upon the user's choice.

(d) If the physical user selects an existing session, then processing is performed to enable digital user 142 to access AppA 128 via the user-selected existing session. The already existing browser tab or webpage corresponding to the user-selected session may be displayed to the physical user and access to AppA 128 is enabled using that existing session. For example, an SSO procedure may be used under that existing session to enable user 142 to access AppA 128. The information stored in LoginGlobalIndexedDB 146 for that session may then be updated to indicate that AppA 128 has been accessed using that session. The flowchart processing then ends.

(e) If instead the physical user selects and requests a new tenancy login, then processing continues with 217. In 217, the physical user is prompted to enter information identifying the new tenancy to be logged into and for which a new session is to be created. At 218, the physical user provides the requested tenancy information. In 218, the physical user may also enter digital user credentials (e.g., username, password) to be used for logging into the new tenancy. These user credentials may be tenancy-specific and may thus be different for different tenancy logins. At 220, the information provided in 218 is communicated from browser 144 to global login application 106.

(f) In certain implementations, after 218, at 219, processing is performed to prevent multiple logins and browser sessions for the same tenancy. If the tenancy information entered in 218 is for a tenancy for which there is already an existing active browser session, then that existing session is used for providing access to AppA 128, and a second login into that tenancy and a second browser session for that tenancy is not allowed. Accordingly, for all active sessions identified by the sessions information read in 216 and their associated tenancies, a second login in any of those tenancies is not allowed. In this manner, multiple logins and multiple sessions for the same tenancy are not allowed. In some use cases, this restriction may be removed, and the user may be allowed to have a second login and a second session for the same tenancy. The physical user is however made aware (in 216) that there already is an existing session for the tenancy.

Figure 3:
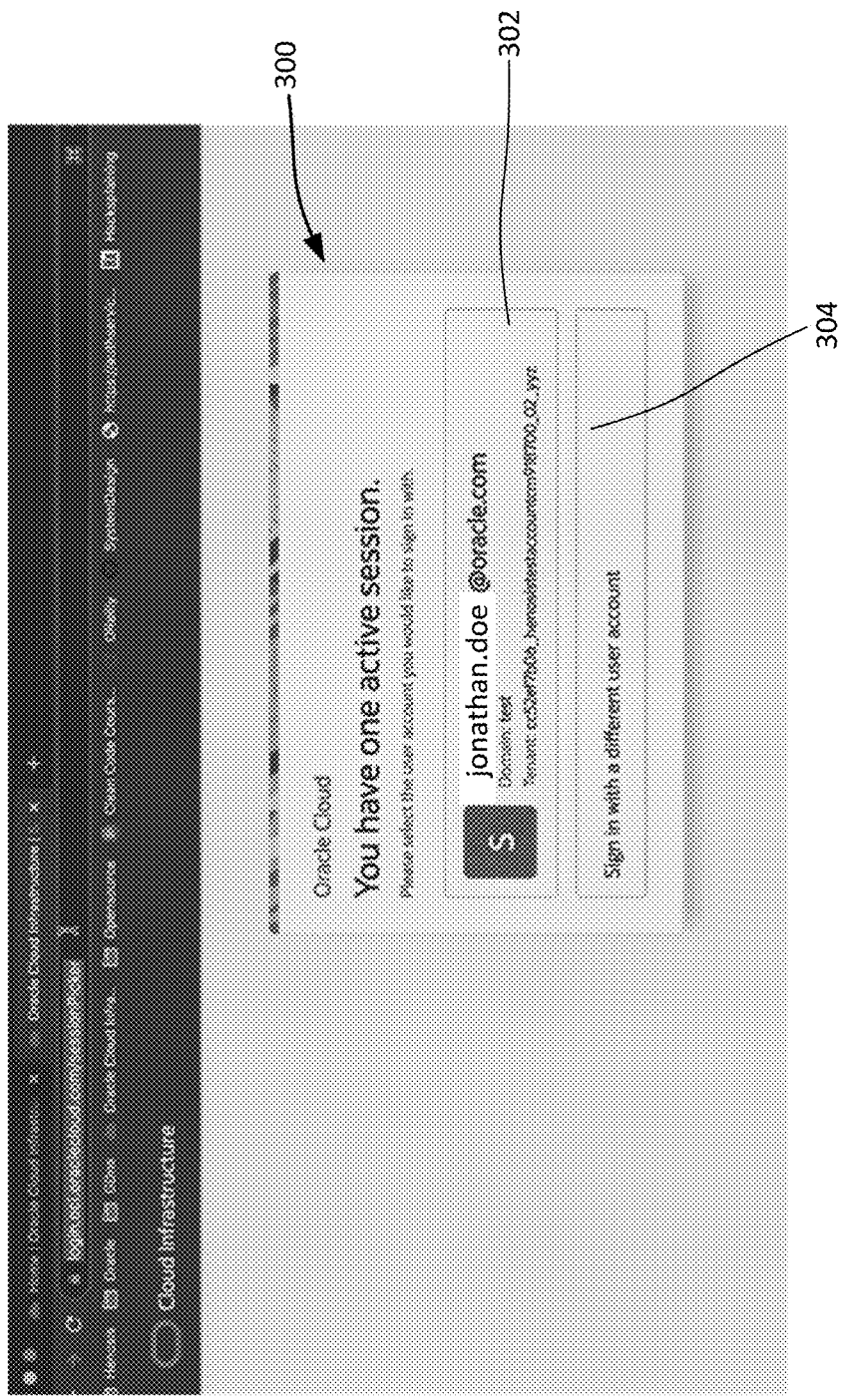
FIG. 3 depicts an example of a graphical user interface (GUI) that may be displayed to a user for selecting an existing session or for indicating a desire to log into a new tenancy, according to certain embodiments.

FIG. 3 depicts an example of a graphical user interface (GUI) 300 that may be displayed to the user for selecting an existing session or for indicating a desire to log into a new tenancy, according to certain embodiments. For example, GUI 300 may output to a physical user via an output interface of the user's device as part of 216, 217, and 218. As shown in FIG. 3, GUI 300 displays information 302 about existing active browser sessions. In the example in FIG. 3, one active browser session exists. For each active session, information 302 that is displayed for the session includes information identifying a digital user (e.g., "jonathan.doe@oracle.com" in FIG. 3)), a domain (e.g., test in FIG. 3), and a tenancy (e.g., "cc52ef7b06_*" in FIG. 3) associated with that existing session. GUI 300 also displays a user-selectable option 304 that enables the physical user to request a login into a new different tenancy account.

The physical user may select the existing active session by clicking on 302 and then the existing session is used to provide user 142 access to AppA 128. If the physical user instead selects 304, then another window may be displayed to the physical user requesting the physical user to input tenancy information for the new login. Responsive to the physical user identifying a new account or tenancy, processing then continues with 219 in FIG. 2A wherein a check is made to prevent multiple logins into the same tenancy is performed. Upon clearing that check (e.g., it is not a multiple logins into the same tenancy scenario), processing continues with 220 wherein the tenancy information provided in 218 is communicated from browser 144 to global login application 106.

Continuing with the flowchart depicted in FIG. 2B, at 222, global login application 106 determines the home region and the home region data center for the tenancy input in 218 and received by global login application 106 in 220. In certain implementations, global login application 106 has access to tenancies-to-home regions mapping information, which identifies the home regions corresponding to various tenancies. Global login application 106 uses this tenancies-to-home regions mapping information to determine the home region for the particular tenancy provided in 218 and received by global login application 106 in 220. In certain implementations, global login application 106 may call a service with the provided tenancy information and the service responds with information identifying the home region for that tenancy.

At 224 and 226, based upon the home region information determined in 222, global login application 106 causes browser 144 to be redirected to home region login application 116 at home region data center 114 in the identified home region for the tenancy. In the example depicted in FIGS. 2A and 2B, the home region is assumed to be Ashburn (ASH) and the browser is directed to home region data center 114 in the ASH home region.

More specifically, at 224, a message is communicated from global login application 106 to browser 144 that enables browser 144 to be redirected to home region login application 116 hosted by home region data center 114. In certain implementations, this message includes a redirect URL corresponding to home region login application 116. For example, if the home region is a data center in Ashburn, the redirect URL may be "login.us-ashburn-1.oraclecloud.com" and points to login application 116 in the Ashburn data center 114. At 226, browser 144 is redirected to home region login application 116 using the redirect URL information received in 224.

In certain implementations, the messages communicated in 224 and 226 may include information about the user request received in 204. For example, a URL pointing to AppA 128 may be included in the messages communicated in 224 and 226. This is so that information is communicated regarding the application to which browser 144 is to be redirected after a session been successfully created.

Since home region login application 116 is hosted by a data center in the home region for the selected tenancy, it has access to IAM artifacts configured for that particular tenancy. Login application 116 is then able to use these IAM artifacts to perform login related processing for the user, as described below with respect to 228, 230, 232, and 234.

More specifically, at 228, home region login application 116 sends a prompt (e.g., user interface) to browser 144 to prompt physical user for user credentials corresponding to digital user 142. At 230, the digital user credentials are obtained (e.g., user login name, password, etc.) and communicated to home region login application 116. At 232, home region login application 116 performs login-related processing. As part of this processing, user 142 is validated using credentials received in 230 and also possibly based upon IAM artifacts configured for the tenancy to be logged into and which are accessible to login application 116. Upon successful validation or authentication, at 234, the user is logged into the tenancy and login application 116 creates a new browser session for the new tenancy login. Login application 116 may store information at home region data center 114 regarding the new login and associated session.

After a new session has been created, the global region data center 104 and global login application 106 are reinserted in the processing flow. This enables global login application 106 and global region data center 106 to have information about all new successful logins and associated sessions. More specifically, at 236 and 238, the home region login application 116 redirects browser 144 back to global login application 106 with information about the new session that has been created. At 236, a message is communicated from home region login application 116 to browser 144 that causes browser 144 to be redirected to global login application 106. In some implementations, the message sent in 236 includes instructions (e.g., code or client-side script), which when executed by browser 144 on user device 140 causes browser 144 to be redirected to global login application 106. In some other implementations, the message communicated in 236 may include a redirect URL to global login application 106.

At 238, based upon the redirect information received in 236, browser 144 is redirected to global login application 106. If the message in 236 included instructions, those instructions may be executed by browser 144 on user device 140 and execution of the instructions causes browser 144 to be redirected to global login application 106. In some other implementations, a redirect URL received in 236 and pointing to global login application 106 may be used in 238 to redirect browser 144 to global login application 106. As a result of the redirection, information is communicated by home region data center 114 to global region data center 104 about successful login by the user in the tenancy and creation of a new browser session for the tenancy.

At 240, global login application 106 sends a message to browser 144 to update sessions information stored by browser 144 to include information about the new login and corresponding session created in 234. In certain implementations, the message sent in 240 includes instructions executable by user device 140 (e.g., a piece of code or client-side script (e.g., JavaScript)), which when executed by browser 144 on user device 140 cause the sessions information stored by browser 144 to be updated, and after the update, redirect browser 144 to AppA 128. For example, the sessions information stored in LoginGlobalIndexedDB 146 is updated to include information about the latest successful tenancy login and the establishment of a new browser session for the new tenancy login.

At 242, instructions received in 240 are executed and cause sessions information stored on user device 140 to be updated to include information about the new login and new associated session created in 234. In certain implementations, the information stored in LoginGlobalIndexedDB 146 is updated to include information about the latest successful tenancy login and the establishment of a new browser session for the new login. The information stored in LoginGlobalIndexedDB 146 for the new session may include a session information, information identifying a tenancy associated with the session, a username, information about AppA 128, and other information.

After the sessions information has been updated in 242, in 244, the executed instructions cause browser 144 to be redirected to AppA 128.

In certain implementations, as part of creating a new session in 234, home region login application 116 may generate a new session token (e.g., a JSON Web Token or JWT) for the newly created session. This session token may be included in the messages communicated in 236, 238, and 240. Processing in 242 may result in the session token also being stored in user device 140. For example, the session token may be stored in LoginGlobalIndexedDB 146 for the session. This session token may also be included in the message communicated from browser 144 to AppA 128 in 244 and stored in IndexedDB in an object store corresponding to AppA 128.

At 246, AppA 128 may send a home page to browser 144 to be displayed by browser 144 in the newly created browser session. This home page may be displayed in a new tab corresponding to the new session by browser 144. User 142 can then access AppA 128 using this home page. This completes the processing depicted in FIGS. 2A and 2B.

Figure 4A:
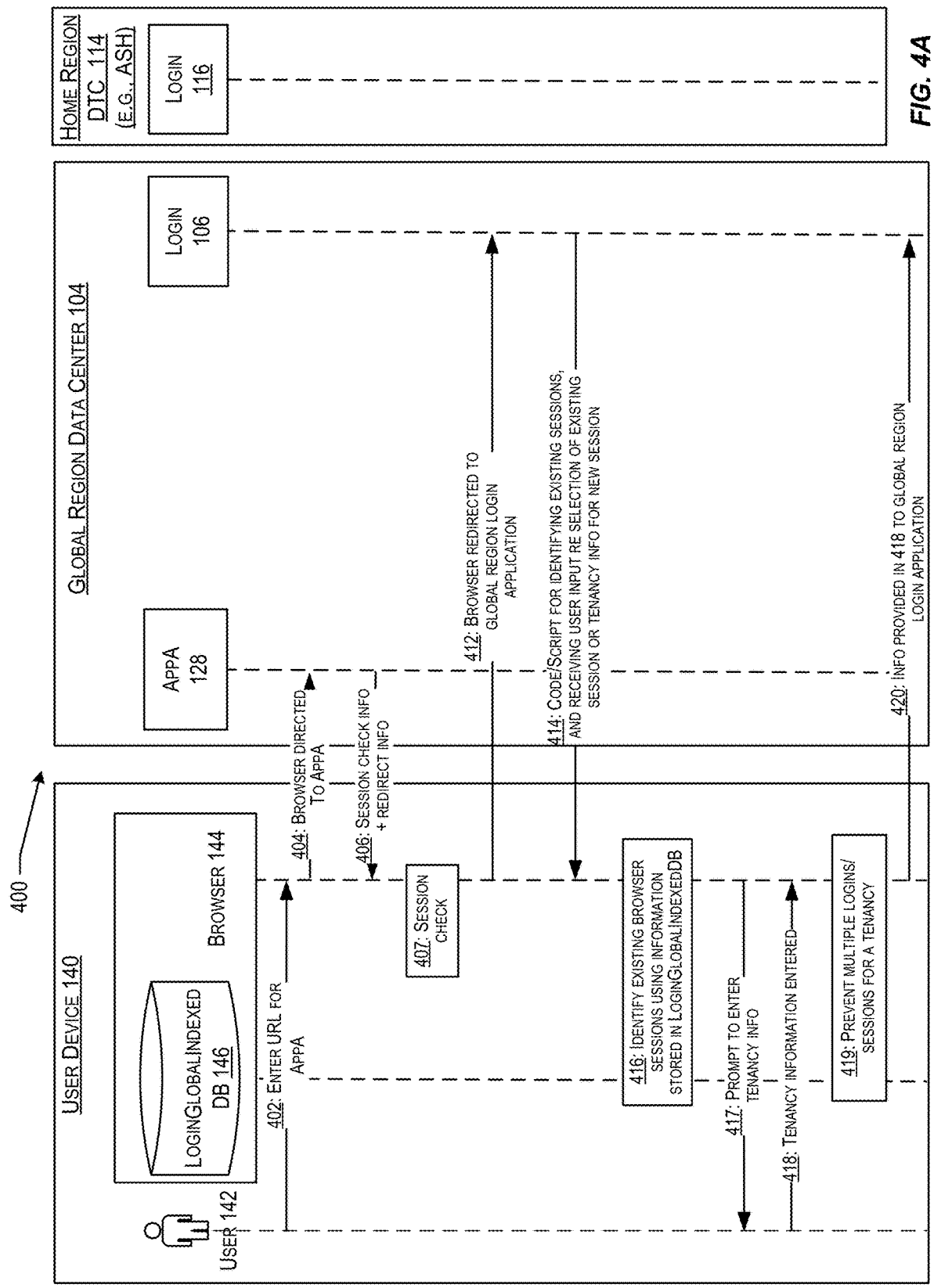
FIGS. 4A and 4B depict a simplified flowchart depicting processing performed for accessing an application from a global region data center according to certain embodiments.
Figure 4B:
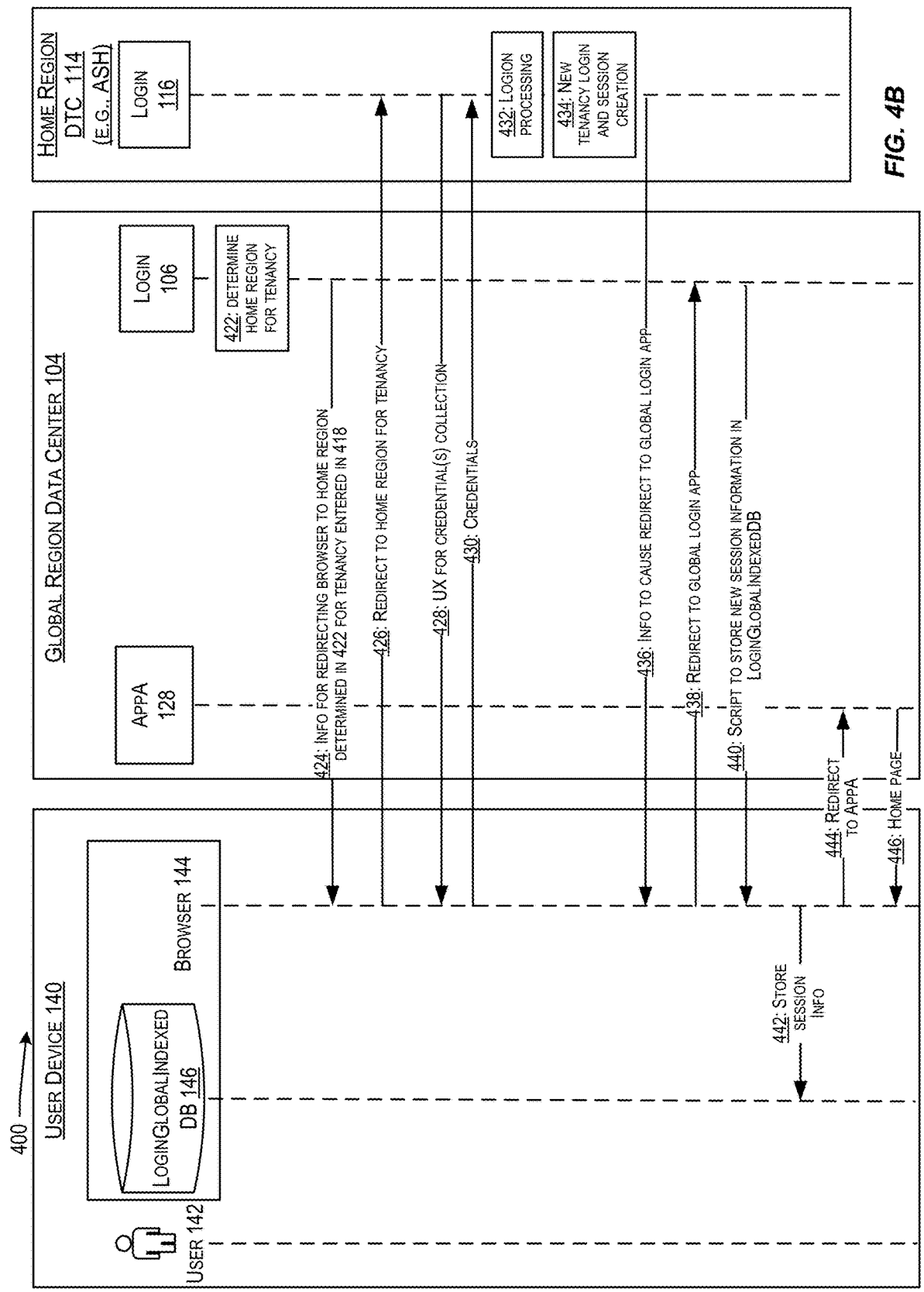

In the embodiment depicted in FIGS. 2A and 2B and described above, AppA 128 was deployed at regional data center 124 in PHX and accessed via browser 144 using endpoint URL "AppA.us-phoenix.oraclecloud.com." In some other instances, the application requested by a user could itself be addressed using a global DNA address and be hosted in a global region data center. This scenario is depicted in FIGS. 4A and 4B and described below. For example, as depicted in FIGS. 4A and 4B, AppA 128 is hosted by global region data center 104 and may have an associated URL of "AppA.oraclecloud.com". User 142 may access AppA 128 using browser 144 by providing this URL to the browser 144.

FIGS. 4A and 4B depict a simplified flowchart 400 depicting processing performed for accessing AppA 128 from a global region data center according to certain embodiments. The processing depicted in FIGS. 4A and 4B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 4A and 4B and described below is intended to be illustrative and non-limiting. Although FIGS. 4A and 4B depicts the various processing steps occurring in a particular sequence or order, this is not intended to be limiting. In certain alternative embodiments, the processing may be performed in some different order, or some steps may also be performed in parallel.

Processing may begin at 402, when user 142 requests access to AppA 128 using browser 144. This can be done by providing URL "AppA.oraclecloud.com" to browser 144. At 404, browser 144 is directed to AppA 128 corresponding to "AppA.us-phoenix.oraclecloud.com" and hosted by global region data center 104. The message communicated from browser 144 to AppA 128 in 404 may also include additional contextual information related to the user request, such as information identifying the digital user, information identifying AppA 128, information identifying browser 144, and other information.

In FIG. 4A, the processing performed in 406 and 407 is similar to the processing performed in 206 and 207 depicted in FIG. 2A, respectively, as described above. If it is determined in 407 that access to AppA 128 via browser 144 has not already been established for user 142 via an existing session, processing proceeds with 412. Processing performed in 412, 414, 416, 417, 418, 419, 420, 422, 424, 426, 428, 430, 432, 434, 436, 438, 440, 442, 444, and 446 is similar to the processing performed in 212, 214, 216, 217, 218, 219, 220, 222, 224, 226, 228, 230, 232, 234, 236, 238, 240, 242, 244, and 246, respectively, as described above.

As depicted in FIGS. 2A, 2B, 4A, and 4B and the associated description, the global region data center 104 and more specifically, the global login application 106 deployed in global region data center 104, is inserted into the login and session setup processing multiple times. The browser 144 is first redirected to global login application 106 in 212 and 412. This redirection is performed for all user requests received from browser 144. Responsive to this redirection, global login application 106 causes instructions to be sent to browser 144, which when executed by the browser cause information from the LoginGlobalIndexedDB 146 to be read to identify one or more existing active browser tenancy sessions. The user is allowed to continue with one of the existing active sessions or to provide information identifying a new tenancy to be logged into. In certain implementations, processing is performed to ensure that multiple sessions using the browser for the same tenancy are prevented. For a new tenancy login to be created, the global login application 106 then determines a home region and a home region data center for the particular tenancy to be logged into and directs the processing to the identified home region data center for login-related processing.

After the user has been successfully logged into the new tenancy and a new associated session has been successfully created, browser 144 is again redirected to global login application 106 at 238 and 438. This redirection is performed each time a user is successfully logged into a new tenancy and a new browser session created for the new login. This time, global login application 106 sends instructions to browser 144 to update sessions information stored client-side on the user device with information regarding the newly created session for the new tenancy login. In certain implementations, the information stored in LoginGlobalIndexedDB 146 is updated to include information about the newly created session. In this manner, information regarding the multiple tenancy sessions that the browser participates in is stored centrally in LoginGlobalIndexedDB 146.

Inserting or involving global login application 106 in the processing, as described above provides, several technical benefits. The task of identifying a home region and a home region data center for a tenancy is centralized in the global region data center. The non-global region data centers in a realm are no longer burdened with this task, thus resulting in extensive savings in resources (including compute and memory resources) for these non-global region data centers. The global login application is now responsible for performing this processing, which reduces the compute burden on the non-global login applications. For example, the tenancies-to-home-regions mapping information may only be stored by the global region data center. A non-global region data center is configured to just redirect all requests to the global region data center. Since the storage of the tenancies-to-home-regions mapping information is centralized in the global region data center, keeping this information updated becomes easier and more manageable.

The global region data center (or more specifically, the global login application executed by the global region data center) has visibility to all the new tenancy logins for a user and the browser sessions created for the logins. The global region data center thus has a global view of all multiple tenancy logins and associated sessions that a browser participates in. The global region data center uses this visibility to store sessions information for the browser that includes information identifying these sessions. The ability to store information regarding multiple sessions in a centralized location, such as in an in-browser LoginGlobalIndexedDB 146, is very beneficial. In certain implementations, the sessions information in stored client-side (i.e., on a user device) in a centralized location from where it can be readily accessed by the global region data center. In certain implementations, the information is stored in an in-browser IndexedDB data store associated with the URL corresponding to the global region data center or with the login application deployed on the global region data center. This information can be easily accessed from this central location. The browser database thus provides a single one-stop location for determining the multiple active sessions for the multiple tenancies using a browser and can be used for various purposes.

The stored sessions information, which includes information identifying the various active sessions that a browser participates in can then be used for various purposes. As one example use case, the sessions information can be used to inform the physical user of the various logins and sessions. This makes the physical user corresponding to a digital user aware of the multiple active logins. For example, if a user is requesting a login into a tenancy, and it is determined by the global region data center, based upon the stored sessions information, that there already exists an active session for that tenancy login, the physical user is made aware of this and given the opportunity to connect to that already existing session.

The stored sessions information can be used to prevent a browser from having multiple logins and associated sessions for the same tenancy simultaneously. For example, if a user is requesting a login into a tenancy, and it is determined by the global region data center based upon the stored sessions information that there already exists an active session for that tenancy, the user may be prevented from initiating an additional login into the same tenancy. In this manner, the global region data center can restrict the number of simultaneous same tenancy logins and associated sessions using the browser. In certain implementations, only one session per tenancy per browser is allowed. This significantly eases sessions management.

The sessions information stored in the central location (e.g., in the browser database) can also be used for sessions cleanup. When a user selects to log out of an application, the global region data center is inserted in the logout processing. The global region data center can query the stored sessions information to identify all active sessions that a user is participating in using the browser, including the session to be closed. Based upon this information, the global region data center can identify all the applications associated with the session to be closed and gracefully log the user out of these applications. The session can then be gracefully closed. The sessions information thus provides a single one-stop location for determining the multiple active sessions for the multiple tenancies and can be used for various different purposes.

Figure 5:
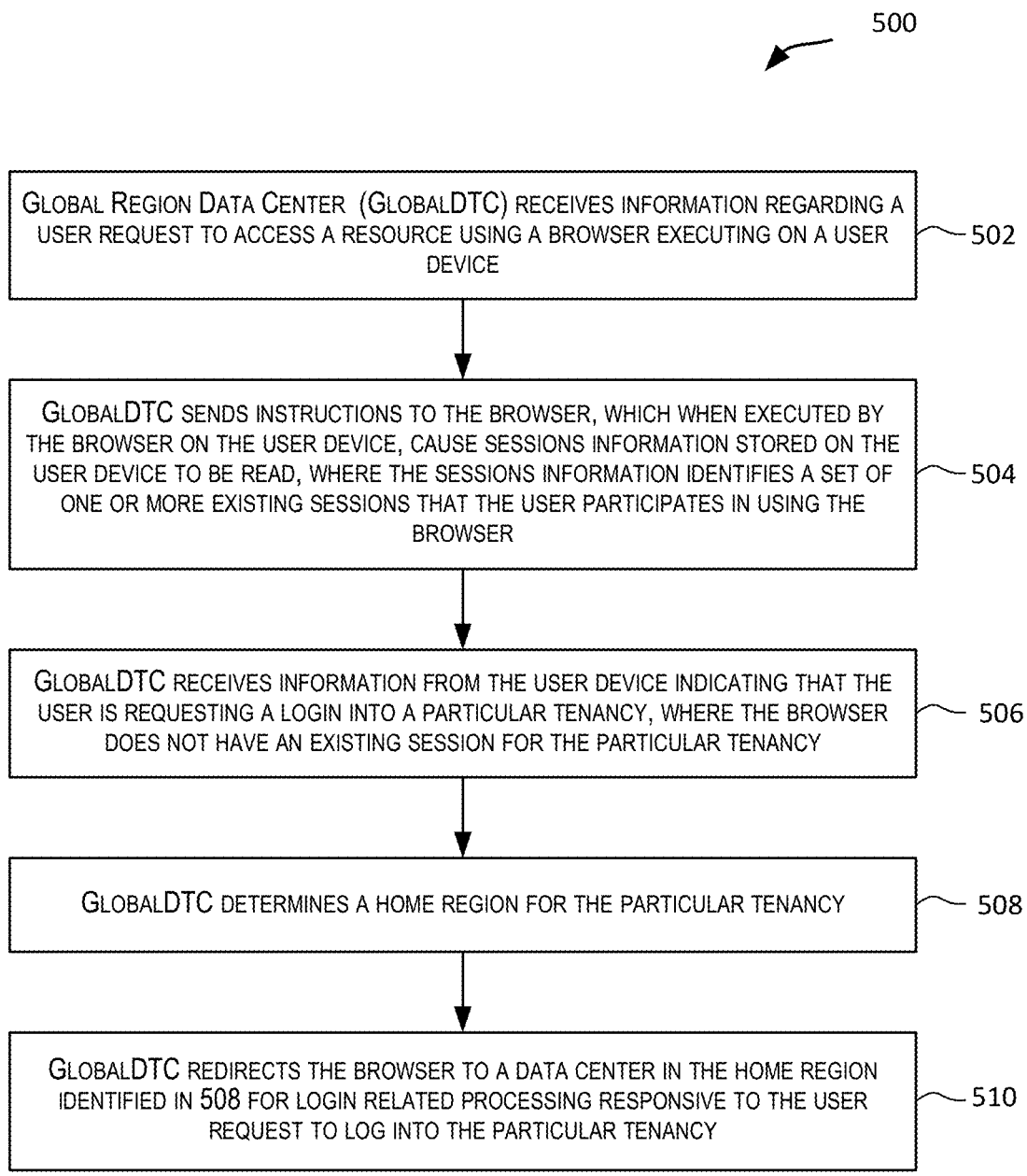
FIG. 5 depicts a simplified flowchart depicting processing performed by global region data center according to certain embodiments.

FIG. 5 depicts a simplified flowchart 500 depicting processing performed by global region data center according to certain embodiments. The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order, or some steps may also be performed in parallel.

At 502, a global region data center receives information regarding a user request to access a resource using a browser executing on a user device. This may result from a redirection of the browser to the global region data center, for example, as shown in 212 in FIG. 2A and 412 in FIG. 4A. The received information may include information identifying the user, the browser, the resource, and the like.

At 504, the global region data center sends instructions (e.g., code, script) to the browser, which when executed by the browser on the user device cause sessions information stored on the user device to be read. This sessions information is information that has been previously stored by the global region data center on the user device and identifies a set of one or more existing tenancy sessions that the browser participates in. As previously described with respect to 216, 217, and 218, the instructions result in the sessions information on the user device being read, for example, from LoginGlobalIndexedDB 146. For each existing active session, the sessions information may identify a tenancy associated with the session, information identifying one or more applications that have been accessed via that session, and other information. The instructions upon execution by the browser on the user device may output information regarding the active sessions to the physical user using the browser. The user can then elect to connect to an existing session or request a new login for a tenancy for which there is no existing browser session.

As previously described, in certain implementations, the instructions sent by the global region data center to the user device in 504 also restrict the user to a single login and session for a tenancy. If the user indicates a tenancy to be logged into and the sessions information indicates that there already is a browser session corresponding to that tenancy, the user is prevented from logging into the same tenancy multiple times and opening multiple sessions.

For purposes of flowchart 500, it is assumed that the user requests a login for a new tenancy. Accordingly, at 506, the global region data center receives information from the user device indicating that the user is requesting a login into a particular tenancy, where the browser does not have an existing session for the particular tenancy. This may correspond to 220 in FIG. 2A and 420 in FIG. 4A.

At 508, the global region data center determines a home region for the particular tenancy identified in the information received in 506. In certain implementations, the global region data center may use tenancies-to-home regions mapping information to determine the home region. This may correspond to 222 in FIG. 2B and 422 in FIG. 4B.

At 510, the global region data center redirects the browser to a home region data center in the home region identified in 508 for login related processing responsive to the user request to log into the particular tenancy. This may correspond to the processing in 224 and 226 in FIG. 2B, and 424 and 426 in FIG. 4B.

Figure 6:
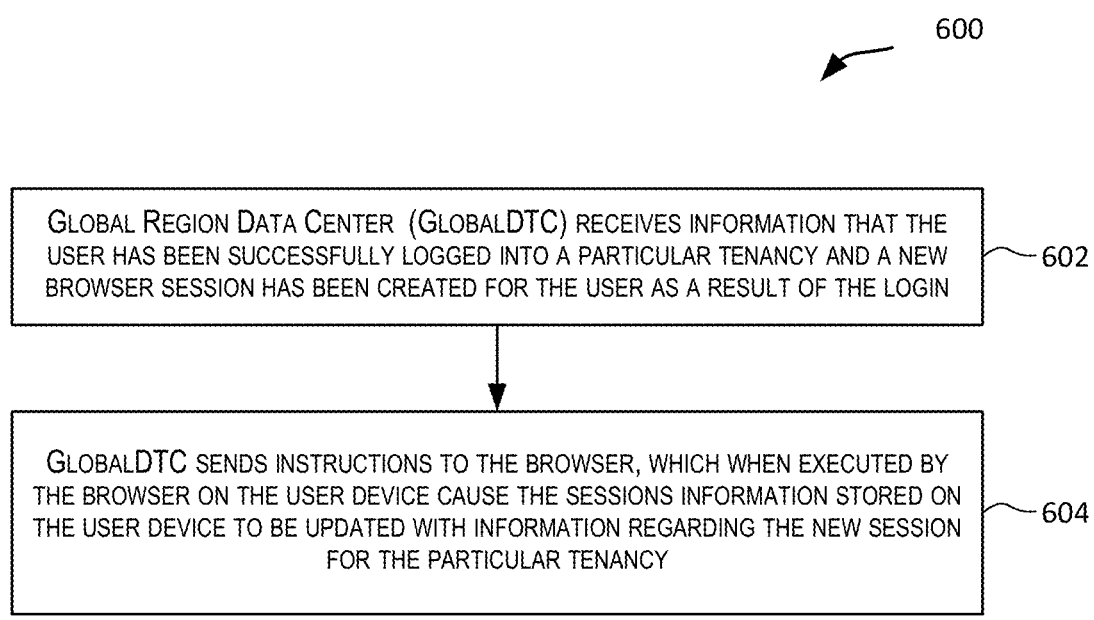
FIG. 6 depicts a simplified flowchart depicting processing performed by global region data center after a successful user login into a tenancy and creation of a new session for the login, according to certain embodiments.
Figure 7B:
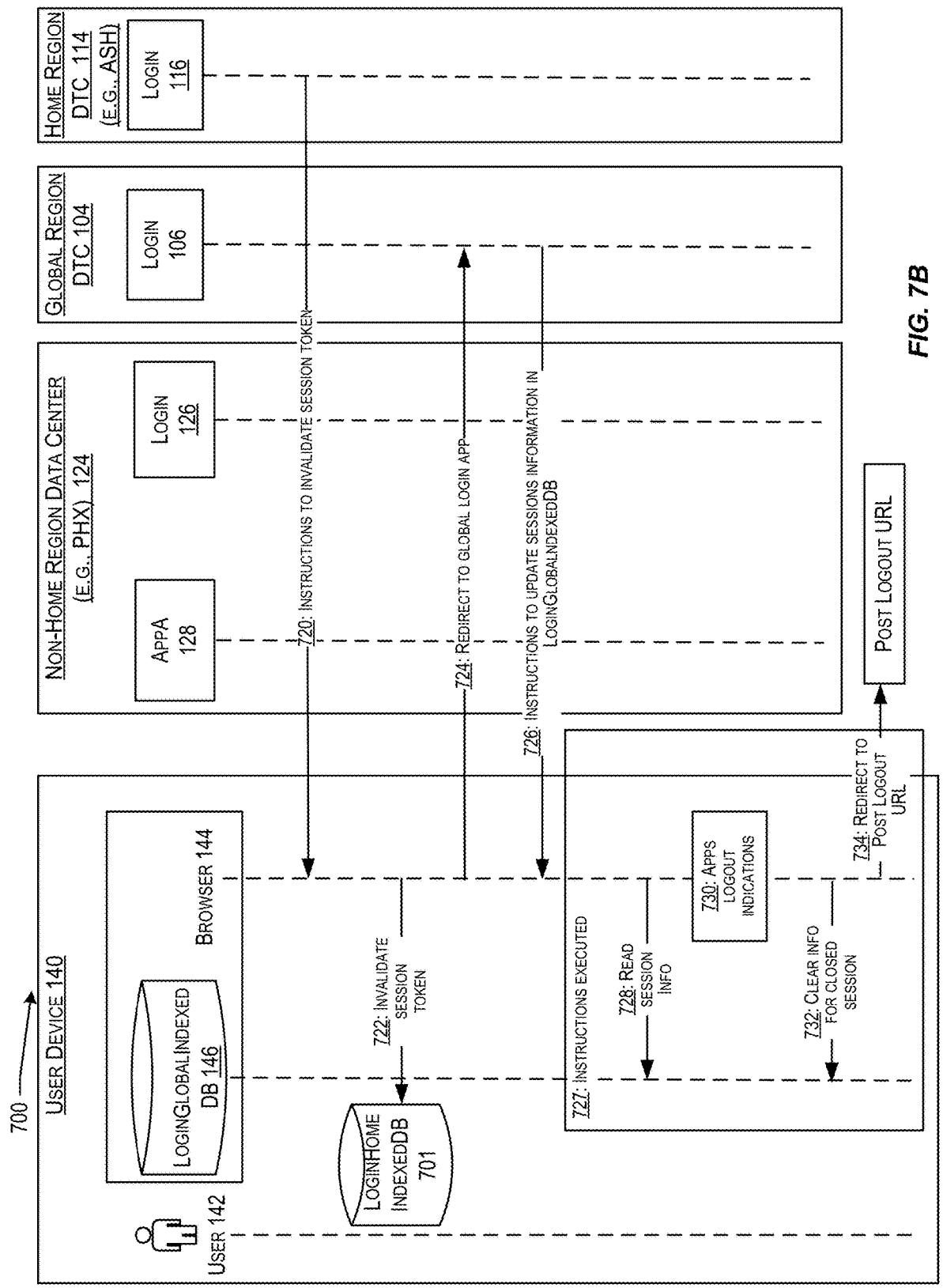

FIG. 6 depicts a simplified flowchart 600 depicting processing performed by global region data center after a successful user login into a tenancy and creation of a new session for the login, according to certain embodiments. The processing depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the processing may be performed in some different order, or some steps may also be performed in parallel.

At 602, the global region data center receives information that the user has been successfully logged into a particular tenancy and a new browser session has been created for the user as a result of the login. This may correspond to the processing in 236 and 238 in FIG. 2B and 436 and 438 in FIG. 4B.

At 604, the global region data center sends instructions to the browser to update the sessions information stored on the user device with information about the new tenancy session. As previously described, these instructions, when executed by the browser on the user device, cause the sessions information previously stored by the global region data center on the user device to be updated with information regarding the new session for the particular tenancy. This may correspond to the processing in 240 in FIG. 2B and 440 in FIG. 4B.

As previously described with respect to 242, 244, and 246, the instructions cause sessions information stored on user device 140 (e.g., stored in in-browser database Login-GlobalIndexedDB 146) to be updated to include information about the new login and new associated session. The information added to the in-browser database may include information identifying the new session, the particular tenancy associated with the session, user information, information about resource (e.g., AppA 128) being accessed, a domain name, and other information. After the sessions information has been updated, the executed instructions may cause the browser to be redirected to the resource (e.g., AppA 128) that the user desires to access. For example, a home page corresponding to the resource may be sent and displayed via browser for the new session. In certain implementations, a session token corresponding to the new session may also be stored as part of the sessions information.

The sessions information stored on the client is also used when a signal is received to log out from a particular application or session. FIGS. 7A and 7B depict a simplified flowchart 700 depicting processing performed during a logout operation according to certain embodiments. The processing depicted in FIGS. 7A and 7B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 7A and 7B and described below is intended to be illustrative and non-limiting. Although FIGS. 7A and 7B depict the various processing steps occurring in a particular sequence or order, this is not intended to be limiting. In certain alternative embodiments, the processing may be performed in some different order, or some steps may also be performed in parallel.

Processing may begin at 702, when user 142 clicks on a logout link for AppA 128 during a browser session for a particular tenancy, thus indicating a desire to log out from AppA 128. For the example depicted in FIGS. 7A and 7B, it is assumed that AppA 128 is hosted in a non-global region data center 124, for example, in PHX.

At 706 and 708, AppA 128 redirects browser 144 to "local" login application 126. At 710 and 712, local login application 126 redirects browser 144 to global login application 106 hosted by global region data center 104. The tenancy information may be carried forward in these communications between AppA 128, local login application 126, and global login application 106.

At 714, global login application 106 determines the home region for the tenancy. The global login application 106 may use the tenancies-to-home regions mapping information to determine the home region for the tenancy. Based upon the home region for the tenancy determined in 714, at 716 and 718, global login application 106 causes browser 144 to be redirected to home region login application 116 hosted by home region data center 114. Processing then continues with FIG. 7B.

Home region login application 116 then performs processing to log the user out from AppA 128 and also to close that particular tenancy session. As part of this processing, at 720, home region login application 116 sends executable instructions (e.g., a script or code) to browser 144 to invalidate the session token stored on user device 140 for the session to be closed and which was used to access AppA 128, the app for which the logout indication was received. Invalidation of the session token results in invalidation and closure of the session.

At 722, the executable instructions received by browser 144 from home region login application 116 in 720 are executed resulting in invalidation of the session token and the session. In certain implementations, as part of 722, the session token stored for the browser session in Login-HomeIndexedDB 701 that stores information for home region login application 116 is invalidated and this invalidates and closes the associated browser session. At 724, execution of the instructions by browser 144 additionally causes browser 144 to be redirected to global login application 106.

At 726, global login application 106 sends instructions (e.g., a script, code) to browser 144 to perform session cleanup tasks. At 727, the instructions received in 726 are executed by browser 144. Execution of the instructions causes the following processing to be performed:

(a) At 728, the sessions information stored in LoginGlobalIndexedDB 146 is read. This information identifies information regarding the various browser sessions that browser 144 participates in, including information about the session that is being closed. For each session, the information also identifies information about one or more applications that have been accessed via that session, including applications accessed using single sign-on procedures.

(b) Based upon the information read in 728, at 730, the one or more applications associated with the session being closed are identified, and, for each application, an indication is output (e.g., readable by the physical user) that the session is being closed and the user (digital user) is being logged out of that application. In certain implementations, for each identified application, an iFrame may be displayed via browser 144 to logout the user from the application. In this manner, the user is logged out of all applications accessed under the session that is closed.

(c) At 732, the sessions information stored in the LoginGlobalIndexedDB is updated by clearing/deleting the entry for the session being closed. In this manner, the closed session is no longer shown as an active session that browser 144 participates in. This updates the sessions information to only reflect active sessions that browser 144 participates in.

(d) At 734, browser 144 may be directed to a post-logout URL, if any, and the processing ends.

In the manner shown above, the sessions information stored in LoginGlobalIndexedDB 146 for global login application 106 is used to perform graceful logout from the session and from all the applications that were accessed via the session. The stored sessions information is also updated such the LoginGlobalIndexedDB 146 has the latest information about the browser's active sessions.

In certain implementations, the various functionalities described above may be offered as part of a cloud services offering by a Cloud Service Provider (CSP). One or more customers may subscribe to the cloud services offered by the CSP on a subscription basis. The following section describes examples of embodiments that may provide such cloud services.

Example Cloud Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model shall the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
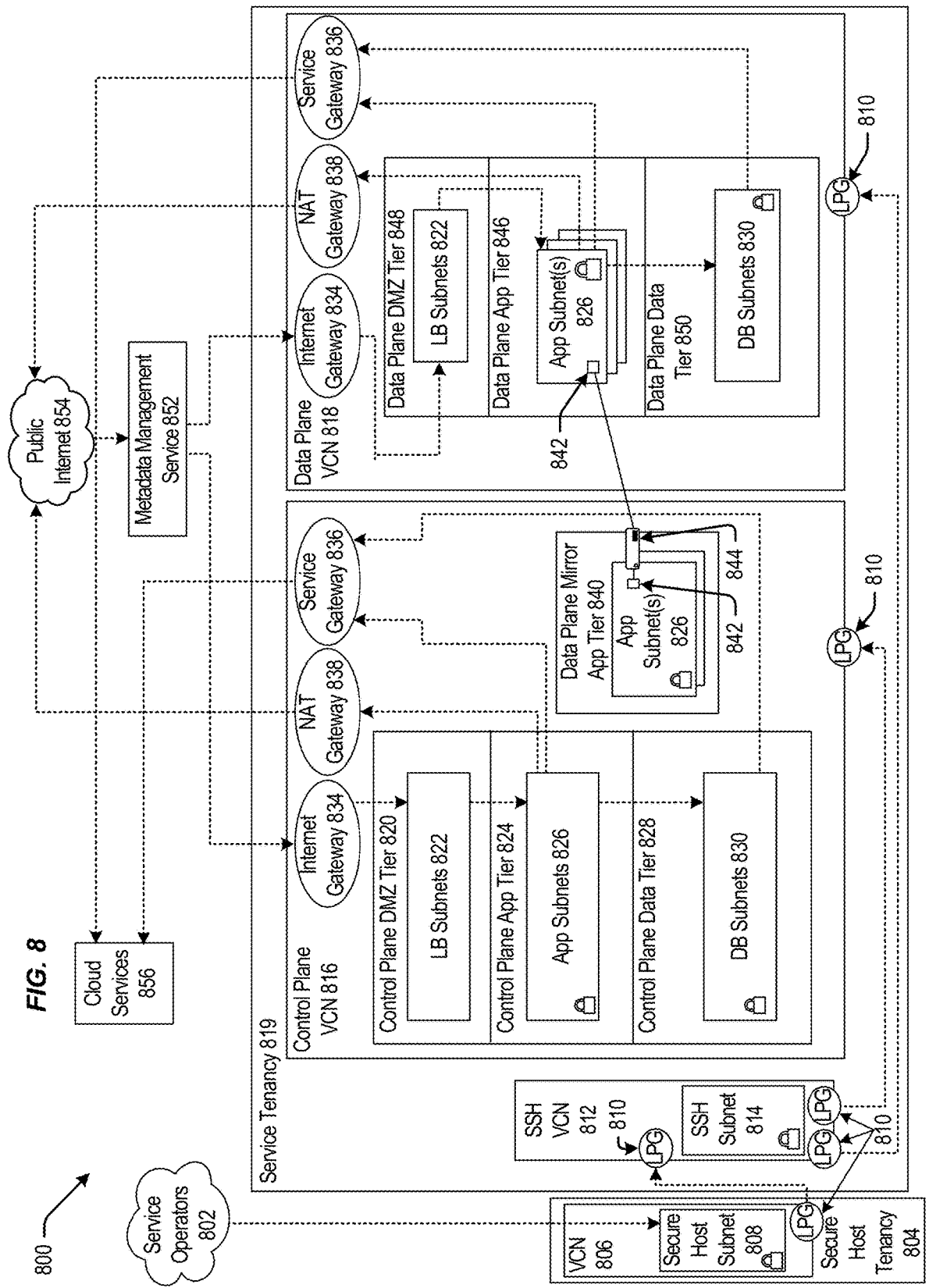
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller/card (VNIC or vNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users' resources, or other customers' resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
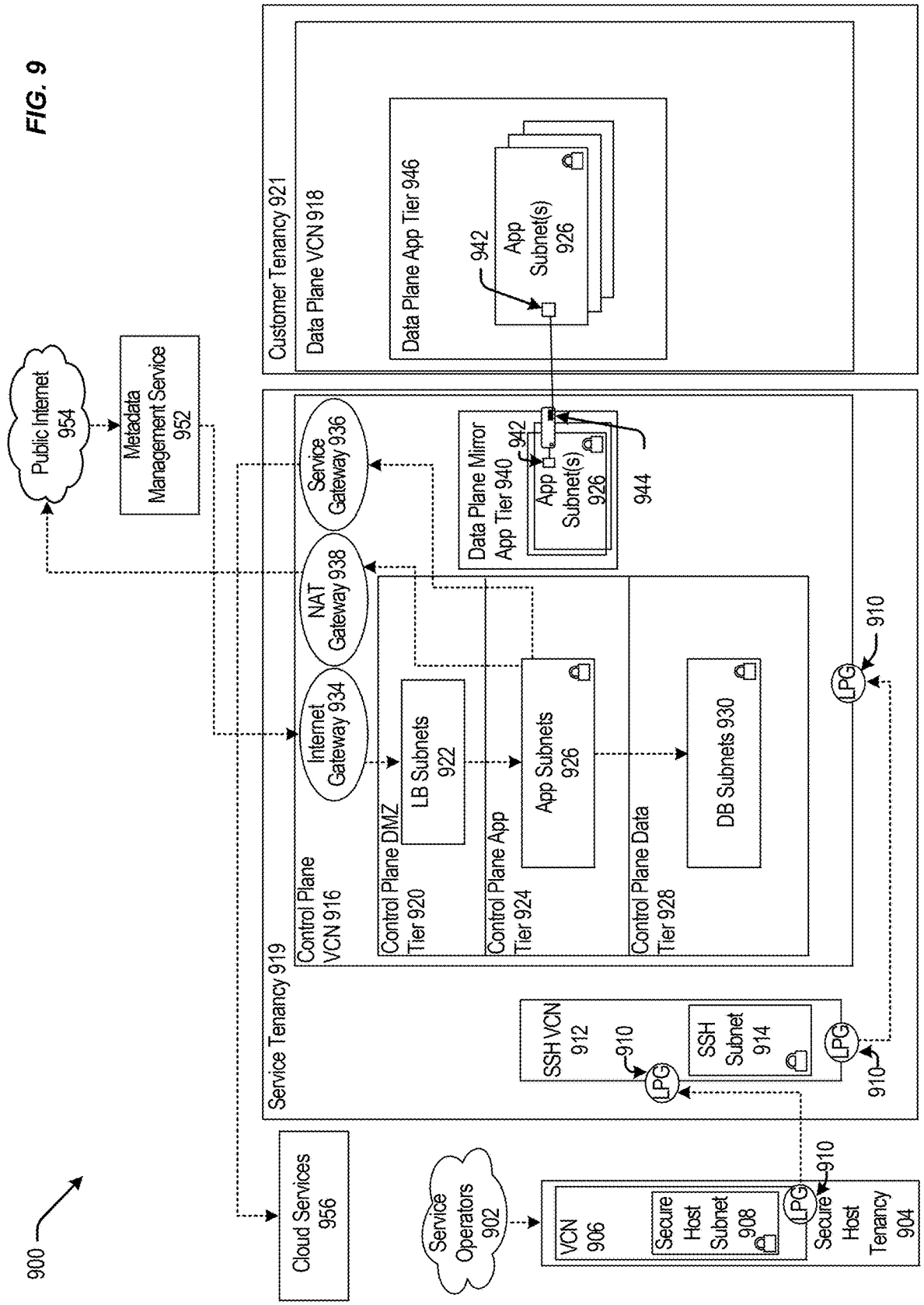
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, which are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
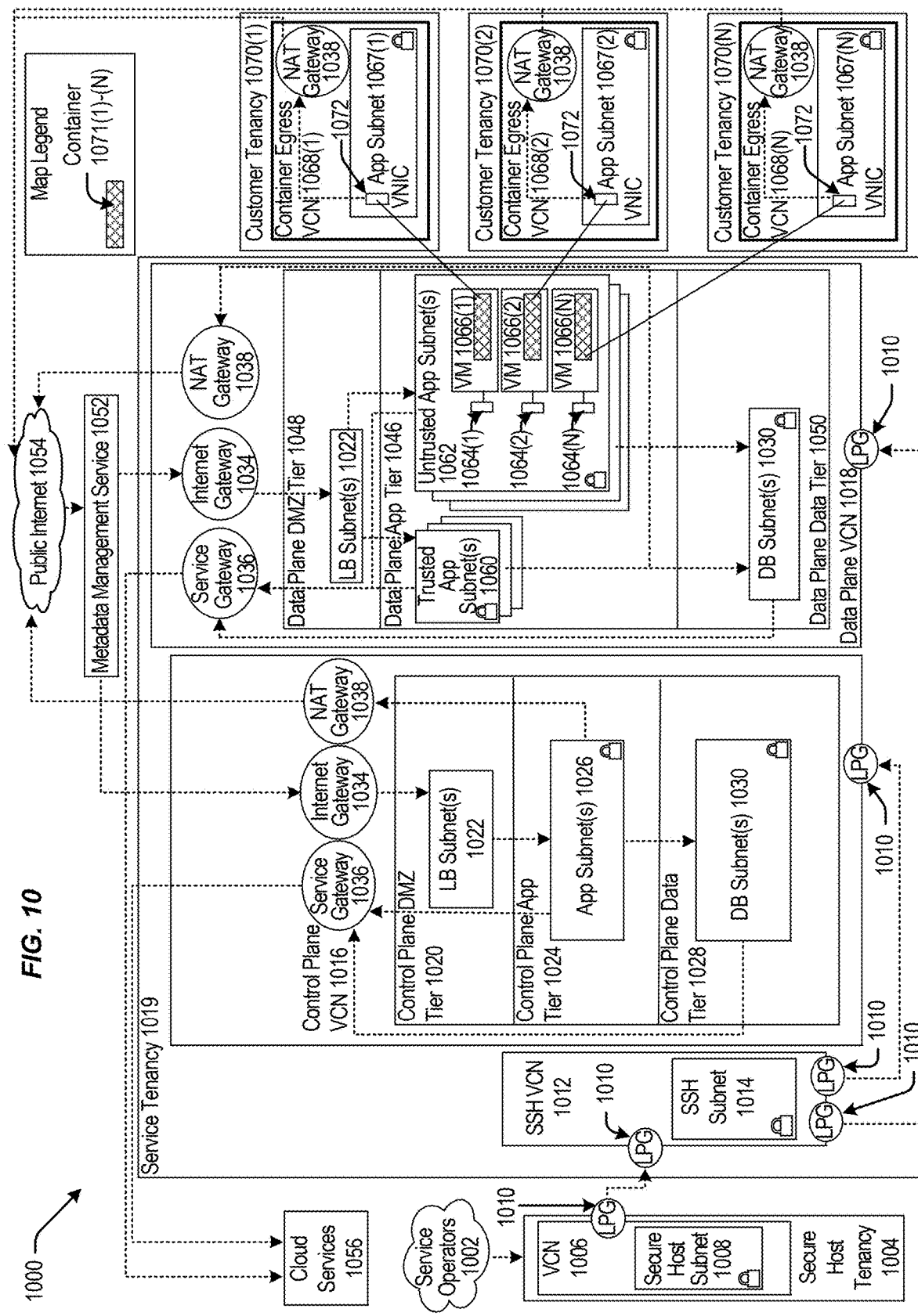
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
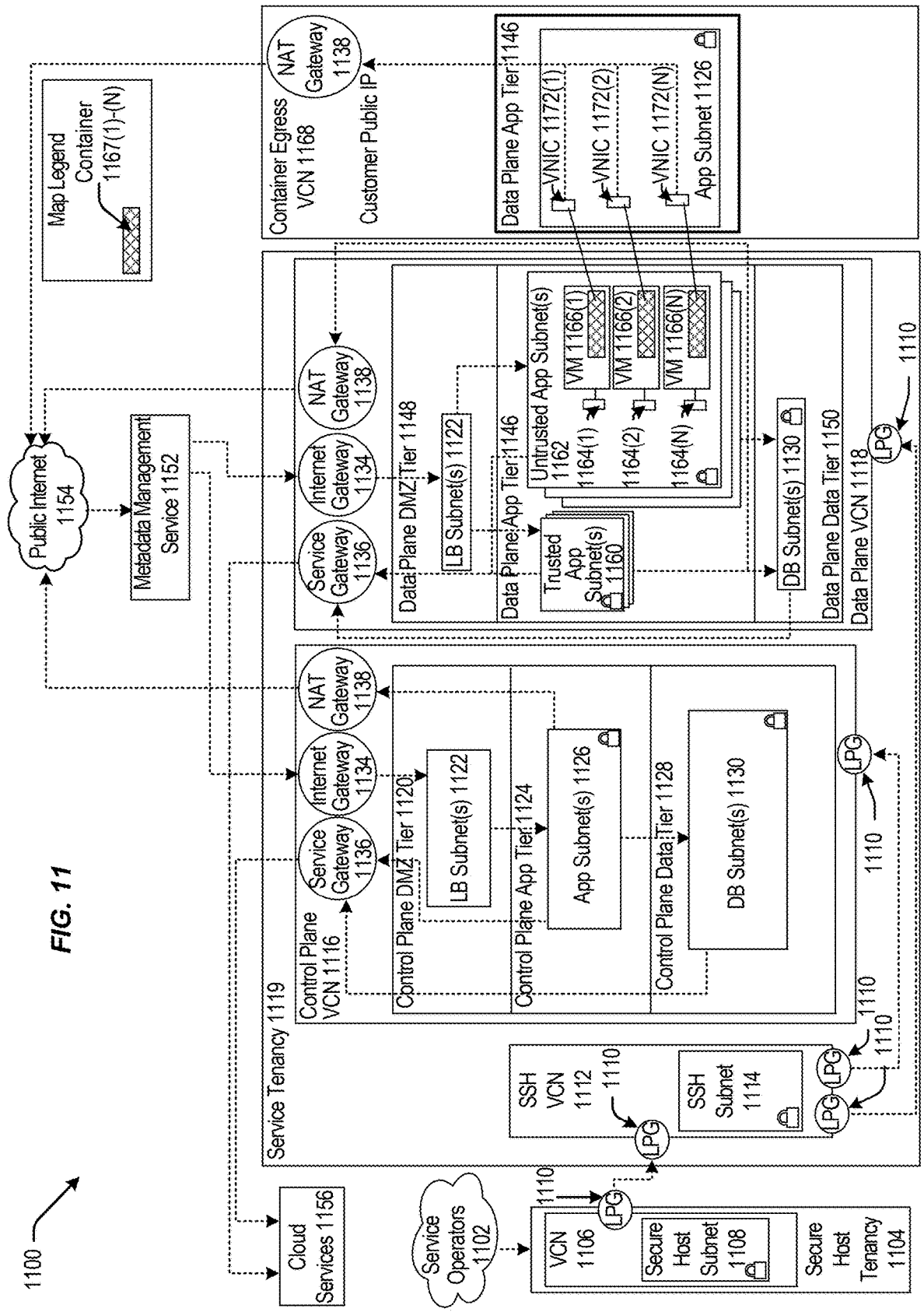
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G, 5G, or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and implementations and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    receiving, by a global region data center, information regarding a request to access an application using a browser executing on a user device;
    communicating, by the global region data center to the user device, a first set of instructions for execution at the user device;
    receiving, by the global region data center from the user device and due to execution of the first set of instructions on the user device, a request to log into a first tenancy via the browser, where the browser does not have an existing session for the first tenancy;
    determining, by the global region data center, a home region for the first tenancy;
    redirecting, by the global region data center, the browser to a home region data center in the identified home region, wherein the home region data center performs processing associated with the request to log into the first tenancy;
    receiving, by the global region data center, information indicative of a first tenancy login into the first tenancy and creation of a new session for the first tenancy login;
    causing, by the global region data center, sessions information stored on the user device to be updated to include information regarding the new session, wherein the sessions information comprises information identifying one or more sessions that the browser participates in; and
    responsive to a log out from the application, causing, by the global region data center, the sessions information stored on the user device to be updated by removing the information regarding the new session from the sessions information.

2. The method of claim 1 wherein the first set of instructions is executed by the browser on the user device.

3. The method of claim 1 wherein the first set of instructions when executed by the browser causes:
    sessions information stored on the user device to be read, the sessions information comprising information identifying one or more sessions that the browser participates in and information identifying a tenancy for each session in the one or more sessions.

4. The method of claim 3 wherein the sessions information is stored by the browser in a data store associated with the global region data center.

5. The method of claim 4 wherein the data store is an IndexedDB database associated with an application hosted by the global region data center.

6. The method of claim 3 wherein the first set of instructions when executed by the browser further causes:
    information to be output via the browser regarding the one or more sessions, wherein the information output for a session includes information identifying a tenancy corresponding to that session.

7. The method of claim 6 wherein the first set of instructions when executed by the browser further prevents multiple sessions from being opened for a particular tenancy when the one or more sessions includes a session associated with the particular tenancy.

8. The method of claim 6 wherein the first set of instructions when executed by the browser further enables input to be received identifying the first tenancy.

9. The method of claim 1 wherein the information regarding the new session includes information identifying the first tenancy.

10. The method of claim 1 further comprising: receiving, by the global region data center, information regarding a request to log out of the application accessed via the new session created for the first tenancy; redirecting, by the global region data center, the browser to the home region data center in the identified home region for the first tenancy; receiving, by the global region data center, a redirect of the browser after invalidation of the new session by the home region data center; and causing, by the global region data center, the sessions information stored on the user device to be updated by removing the information regarding the new session from the sessions information.

11. The method of claim 10 wherein the causing the sessions information stored on the user device to be updated comprises:
    communicating, by the global region data center to the user device, a second set of instructions for execution by the browser on the user device, wherein the second set of instructions when executed by the browser causes the information regarding the new session to be removed from the sessions information.

12. The method of claim 11 wherein the second set of instructions when executed by the browser further cause processing to be performed at the user device comprising:
    from the sessions information stored on the user device, identifying a set of one or more applications accessed using the new session; and
    performing a logout for each application in the set of applications.

13. The method of claim 1 further comprising:
    validating, by the home region data center, the request to log into the first tenancy using one or more identity and access management artifacts stored by the home region data center for the first tenancy; and
    upon successful validation, facilitating logging into the first tenancy and creation of the new session.

14. The method of claim 1 wherein determining, by the global region data center, the home region for the first tenancy comprises:
    using, by the global region data center, information mapping a set of tenancies to their corresponding home regions to determine the home region for the first tenancy.

15. A non-transitory computer-readable medium storing computer-executable instructions that, when executed by one or more computer systems of a global region data center, cause the global region data center to perform processing comprising:
    receiving, by the global region data center, information regarding a request to access an application using a browser executing on a user device;
    communicating, by the global region data center to the browser, a first set of instructions for execution by the browser;
    receiving, by the global region data center from the browser and due to execution of the first set of instructions by the browser, information identifying a first tenancy;

redirecting, by the global region data center, the browser to a home region data center in a home region for the first tenancy;

receiving, by the global region data center, information indicative of a first tenancy login and creation of a new session for the first tenancy login;

causing, by the global region data center, sessions information stored on the user device to be updated to include information regarding the new session, wherein the sessions information comprises information identifying one or more sessions that the browser participates in; and responsive to a log out from the application, causing, by the global region data center, the sessions information stored on the user device to be updated by removing the information regarding the new session from the sessions information.

16. The non-transitory computer-readable medium of claim 15 wherein the sessions information is stored by the browser in a data store associated with the global region data center.

17. A system comprising:

one or more computer systems, wherein the one or more computer systems are configured to perform processing comprising:

receiving a browser redirect responsive to a request to access an application using the browser executing on a user device;

receiving, from the browser, information identifying a first tenancy for a new login using the browser;

redirecting the browser to a home region data center in a home region for the first tenancy;

receiving information indicative of a first tenancy login and creation of a new session for the first tenancy login;

causing sessions information to be stored by the browser indicative of the new session and the associated first tenancy; and responsive to a log out from the application, causing, by the global region data center, the sessions information stored on the user device to be updated by removing the information regarding the new session from the sessions information.

* * * * *